United States Patent
Pradeep et al.

(10) Patent No.: US 10,037,233 B2
(45) Date of Patent: *Jul. 31, 2018

(54) SYSTEM HAVING IN-MEMORY BUFFER SERVICE, TEMPORARY EVENTS FILE STORAGE SYSTEM AND EVENTS FILE UPLOADER SERVICE

(71) Applicant: salesforce.com, inc., San Francisco, CA (US)

(72) Inventors: Aakash Pradeep, Fremont, CA (US); Adam Torman, Wanut Creek, CA (US); Alex Warshavsky, Walnut Creek, CA (US); Samarpan Jain, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,219

(22) Filed: Feb. 27, 2017

(65) Prior Publication Data

US 2017/0168880 A1    Jun. 15, 2017

Related U.S. Application Data

(63) Continuation of application No. 14/976,115, filed on Dec. 21, 2015, now Pat. No. 9,632,849.

(Continued)

(51) Int. Cl.
*G06F 3/00* (2006.01)
*G06F 9/44* (2018.01)
*G06F 9/46* (2006.01)
*G06F 13/00* (2006.01)
*G06F 9/54* (2006.01)
*G06F 17/30* (2006.01)

(Continued)

(52) U.S. Cl.
CPC .............. *G06F 9/542* (2013.01); *G06F 3/061* (2013.01); *G06F 3/067* (2013.01); *G06F 3/0619* (2013.01); *G06F 3/0643* (2013.01); *G06F 3/0656* (2013.01); *G06F 17/30091* (2013.01); *G06F 17/30203* (2013.01); *H04L 67/2842* (2013.01); *H04L 67/42* (2013.01)

(58) Field of Classification Search
None
See application file for complete search history.

(56) References Cited

U.S. PATENT DOCUMENTS 5,577,188 A   11/1996  Zhu
5,608,872 A    3/1997  Schwartz et al.
(Continued)

*Primary Examiner* — Craig C Dorais
(74) *Attorney, Agent, or Firm* — Lorenz & Kopf, LLP

(57) ABSTRACT

Computer-implemented methods and systems are provided for writing events to a data store. An application server generates events, the data store that stores the events, and a temporary events file storage system (TEFSS) temporarily stores groups of events as events files. When events are unable to be written directly to the data store, an indirect events writer is invoked that includes event capture threads each being configured to generate a particular events file, and write it to the TEFSS. Each events file includes a plurality of events flushed from an in-memory buffer service. An events file uploader service reads the events file(s) from the TEFSS, and then writes the events from each of the events files to the data store.

29 Claims, 19 Drawing Sheets

Related U.S. Application Data

(60) Provisional application No. 62/218,871, filed on Sep. 15, 2015.

(51) Int. Cl.
*G06F 3/06* (2006.01)
*H04L 29/08* (2006.01)
*H04L 29/06* (2006.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0200520 A1* | 9/2006 | Vernon ............ H04L 29/06027 709/204 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |

(56) References Cited

U.S. PATENT DOCUMENTS

| | | |
|---|---|---|
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0326277 A1* | 12/2013 | Supplisson ........... G06F 11/079 714/37 |
| 2014/0136274 A1* | 5/2014 | Kieselbach ........ G06Q 10/0633 705/7.27 |

* cited by examiner

Event Uploader Job Detail Table

| Cluster ID | Instance_Id | App_Server_Name | GroupId | File_Name | Num_Events | Job_Started_Date | Last Updated Time | Retry Attempt | Job Type | Status |
|---|---|---|---|---|---|---|---|---|---|---|
| | | | | | | | | | | |
| | | | | | | | | | | |

⏟ 1010

FIG. 10

SYSTEM HAVING IN-MEMORY BUFFER SERVICE, TEMPORARY EVENTS FILE STORAGE SYSTEM AND EVENTS FILE UPLOADER SERVICE

RELATED APPLICATIONS

This application is a continuation of U.S. application Ser. No. 14/976,115, filed Dec. 21, 2015, which claims the benefit of U.S. Provisional Application No. 62/218,871, filed Sep. 15, 2015, the entire contents of which are hereby incorporated by reference herein.

TECHNICAL FIELD

This disclosure relates to the field of multi-tenant server operation, and in particular to an in-memory buffer service for a server that provides improved reliability.

BACKGROUND

A data buffer is a region of a physical memory storage used to temporarily store data while it is being moved from one place to another. In an application server implementing a data buffer, data objects may be stored in a buffer as they are retrieved from a client device or application before they are processed or sent elsewhere for more permanent storage. Buffers can be implemented in a fixed memory location in hardware, or by using a virtual data buffer in software, pointing at a location in the physical memory. Buffers are typically used when there is a difference between the rate at which data is received and the rate at which it can be processed, or in the case where these rates are variable. A buffer can be used to adjust timing by implementing a queue algorithm in memory, simultaneously writing data into the queue at one rate and reading it at another rate.

High-throughput, scalable, continuous events require transportation and queuing to a large data store, such as a non-relational, distributed database like Hbase.

To address this issue and provide that high-throughput, an In-Memory Buffer Service (IMBS) was recently developed as described, for example, in U.S. patent application Ser. No. 14/705,750, filed May 6, 2015, entitled "In-Memory Buffer Service," and assigned to the assignee of the present invention, which is incorporated herein by reference in its entirety. The IMBS is a store and forward based service for objects. The IMBS is designed to provide a very low latency API to write objects to data store 130 (e.g., currently it takes 0.08 microseconds to write an object). The IMBS keeps events in memory until the number of objects reaches a configured limit and for a given time (e.g., 10 seconds). In one implementation, the IMBS can include a capture service running on an application server that receives events from a client application running on an application server to be stored in a data store. The IMBS stores the events in an in-memory bounded buffer on the application server. The in-memory bounded buffer is responsible to support a concurrently writable API, which stores events in memory and includes a buffer flush regulator that manages flushing of this buffer. The in-memory bounded buffer includes a plurality of single-threaded segments, and the capture service can write events to each segment in parallel. When a number of events stored in the in-memory bounded buffer reaches a predefined limit, the in-memory bounded buffer provides a notification to the buffer flush regulator. The in-memory bounded buffer receives a request to flush the events in the in-memory bounded buffer from a consumer executor service. The consumer executor service is responsible for consuming the events in the in-memory bounded buffer using a dynamically sized thread pool of consumer threads to read the segments of the bounded buffer in parallel to allow the events to be written directly to the data store. Events can be consumed in parallel fashion to allow for high throughput.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 10 is a data structure diagram illustrating a schema used for each uploader job record that is stored at the events uploader job detail table according to an embodiment.

DETAILED DESCRIPTION

Figure 1:
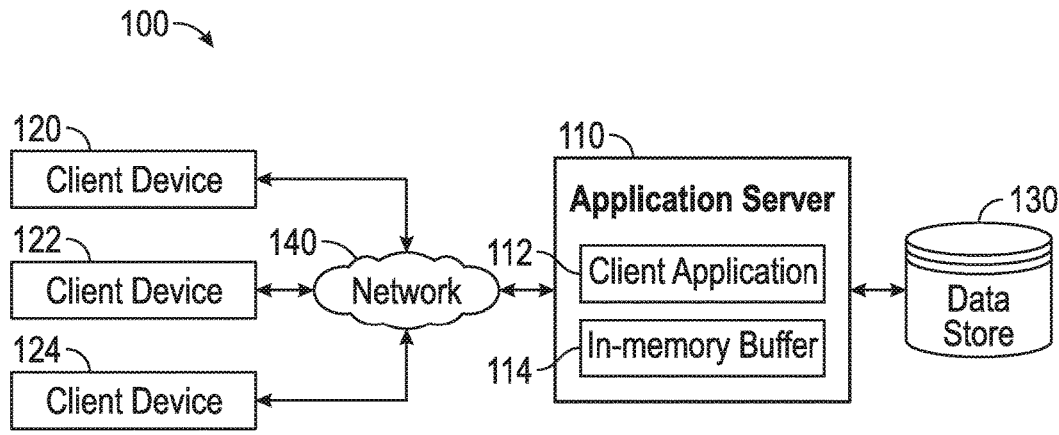
FIG. 1 is a block diagram illustrating a computing environment with an in-memory buffer service, according to an embodiment.

Embodiments are described for an in-memory buffer service. In certain high volume event systems, it may be beneficial to ingest and process events as quickly and efficient as possible (i.e., in real-time). As used herein, the term "event" refers to a tuple (or list of values or elements) which represents something that happened. An event is immutable (or irreversible) and timestamped. The "something" that happened can be anything. In one context, an event can be a tuple that characterizes an action taken by a user with respect to data, such as action taken on data that describes an object. For instance, an event can refer to data that characterizes an action performed by interaction with respect to a client application being executed at the application server. Events can be monitored and recorded (or logged) to capture user actions such as the use of applications, windows opened, system commands executed, check boxes clicked, text entered/edited, URLs visited and nearly every other on-screen event.

Events can include standard events, and custom events. Depending on the implementation, processing of events may include ingesting, processing, and persisting potentially millions of events over the span of an hour or billions of events over the span of a week. For instance, a certain system may store up to a week's worth of details from sets of operations that are executed as a single unit (e.g., "Apex transactions") in an open source, non-relational, distributed database such as Apache HBase™, or other data store. This may be accomplished by pointing a debug log event handler that supplies limit usage information, or any other program or component that generates a high volume of events or other data elements to the data store. In other embodiments, some other data store may be used, such as a NoSQL database, a non-open source database, a relational database, a non-distributed database, or other type of data store.

In an implementation that averages 7.3 billion Apex executions per month (or 243 million per day) being stored in the data store, storing one row per transaction limit with 8 types of limits would require storing 58.4 billion rows per month or about 1.8 billion rows per day across an entire service. Thus, if only raw event data were kept around for a week, that would require 13.1 billion rows at a time before being deleted. In other implementations, there may be up to 15 types of limits, which would result in even more rows being stored. This high volume situation could benefit significantly from a new way for handling event data at scale with high throughput.

In one embodiment, an in-memory buffer service running on a multi-tenant application server provides a low latency application program interface (API) that writes objects, such as event records, to the data store. In other embodiments, the application server may not server multiple clients, but rather is utilized by a single client that generates significant a volume of event data. The in-memory buffer service provides a "store and forward" based service for data objects, where those objects (e.g., events) are temporarily stored in an in-memory bounded buffer before being forward to a data store for longer term storage. A capture service can store events in a bounded buffer, where they may be kept in memory until the number of objects reaches a predefined limit, or the events have been in memory for a predetermined period of time (e.g., 5 seconds, 10 seconds, 30 seconds, 1 minute, etc.). The in-memory buffer provides a very low latency API to write objects and can be done very quickly. For instance, in some examples, writing the bounded buffer can be done in as little as 0.08 microseconds.

The in-memory buffer may be responsible for supporting a concurrently writable API, which enables the storing of events in memory and manages flushing of the buffer. In some embodiments, the in-memory buffer may include a plurality of buffer segments, where each segment is single threaded. Each segment can support high read consistency by waiting until all (or most) write threads are complete before read threads are initiated. Thus, each segment may only be read once. Additionally, the concurrent bounded buffer, comprised of segments, may be used to store events concurrently from various threads. The bounded buffer may also maintain a notion of load factor and may support two types of overflow policies. In some embodiments, the bounded buffer keeps the latest object by replacing an oldest object with a recent object (i.e., first in first out). In another embodiment, the bounded buffer drops the latest object if the buffer is full. A buffer flush regulator may further be used to regulate the flushing of the buffer. The regulating may be based on size and time, which will queue up the event for consumption and writing to the data store. For example, a buffer flush may be initiated when the buffer load reaches some predefined limit (e.g., 80% capacity). In one embodiment, the concurrent bounded buffer may provide a notification when the number of objects reaches a predefined limit that triggers buffer flushing.

Additionally, a consumer executor service is responsible for consuming the in-memory buffer and uses a dynamically sized thread pool to consume (i.e., process) the objects in parallel fashion in order to maximize throughput. The consumer executor service may include a service thread that initiates automatic restarts if a main thread is interrupted. The extension may also include an asynchronous API for starting and stopping a thread. The service thread further may use, in one implementation, Java's ThreadPool to get worker to run the consumer tasks concurrently and in a reliable manner. The service thread also may iteratively call blockedGetAndReset( ) API of the buffer and may assign a set of data to the consumer task. The consumer task may be eventually run by the ThreadPool's worker thread.

A consumer factory of the consumer executor service allows a user to customize a consumer task. A consumer task may first try to write to the data store (e.g., HBase™, Bigtable™, MongoDB™, etc.) directly in a given time in order to reduce the load on an asynchronous message delivery mechanism (e.g., a message queue (MQ)) and to make data available instantaneously. If writing to the data store fails, however, the consumer task may enqueue objects in the MQ, which eventually writes the objects to the data store via an MQ Handler. In some embodiments, a shutdown hook is used to close the service properly when a shutdown of the application server is requested. A log of statistics may also be kept, and the consumer executor service may be restarted if it was terminated for unknown reasons.

I. In-Memory Buffer Service

FIG. 1 is a block diagram illustrating a computing environment with an in-memory buffer service, according to an embodiment. In one embodiment, network environment 100 includes application server 110, client devices 120, 122, 124 and data store 130. Application server 110 and client devices 120, 122, 124 may be connected through a series of one or more networks 140, which may be, for example, a local area network (LAN), a wide area network (WAN), a global area network (GAN) such as the Internet, or a combination of such networks. In another embodiment, application server 110 and client devices 120, 122, 124 may have a direct connection to each of the other devices in the network. The illustrated embodiment shows one application server 110, and three client devices 120, 122, 124; however, in other embodiments, there may be any number of servers or client devices, and environment 100 may include additional and/or different components.

Each of client devices 120, 122, 124 may be, for example, a personal computer (PC), workstation, laptop computer, tablet computer, mobile phone, smartphone, personal digital assistant (PDA) or the like. Client devices 120, 122, 124 may communicate with application server 110 to access resources on application server, such as client application 112. For example a user may access client application 112 through a web browser or other HTTP client application on the client device.

In one embodiment, application server 110 may be any computing device, such as computing system 800, described below with respect to FIG. 16. In one embodiment, application server 110 may be a multi-tenant application server designed to provide access to a number of client applications, such as client application 112, to one more client devices, such as client devices 120, 122, 124. In another embodiment, application server 110 may be a single-tenant application server design to service a single client. Client application 112 and other resources provided by application server 110, such as processing resources, storage resources, etc., may be maintained by application server 110 and made available to the users of client devices 120, 122, 124 as needed (i.e., "on-demand"). This application server 110 can include various elements of hardware and software of a database system may be shared by one or more customers or tenants. For example, application server 110 may simultaneously process requests for a great number of customers. Application server 110 may include an application platform including a framework that allows the applications to execute, such as the hardware or software infrastructure of the system. In one embodiment, the application platform enables the creation, management and execution of one or more applications, such as client application 122, developed by the provider of the application server, customers accessing the application server 110 via client devices 120, 122, 124, or third party application developers.

In one embodiment, application server 110 includes in-memory buffer service 114. In-memory buffer service 114 can ingest and process events generated by client application 112, buffer those events and eventually store the events in data store 130. In one embodiment, data store 130 provides an application programming interface (API) which can be called by the in-memory buffer service 114 in order to store the events in data store 130. In one embodiment, data store 130 may be an open source, non-relational, distributed database such as Apache HBase™, Bigtable™, MongoDB™, or other data store. Examples of events generated by client application 112 may include errors, exceptions, faults, failures, crashes, incidents, or other occurrences. For example, client application 112 may include a user interface layer that presents a user interface visible on one of client devices 120, 122, 124. Through selection of a user interface element, the user may initiate some processing operation in a logical layer of the client application that hits some hard limit defined by the application server 110 (e.g., number of processing cycles consumed per day, amount of storage resources consumed) and page rendering is stopped. The reaching of this hard limit may trigger the creation of an event by client application 112 which is recorded for possible future review. The volume at which such events are potentially generated and conventional means for recording and storing these events may result in an unacceptable level of latency. As such, in one embodiment, in-memory buffer service 114 can ingest and process the events, buffer the events and eventually store the events in data store 130. The buffering of the events in memory before storage in data store 130 can allow a high volume of events to be processed in near real-time with minimal latency and without adversely affecting performance of the application server 110 or client application 112. Additional details of the in-memory buffer service 114 are provided below.

Figure 2:
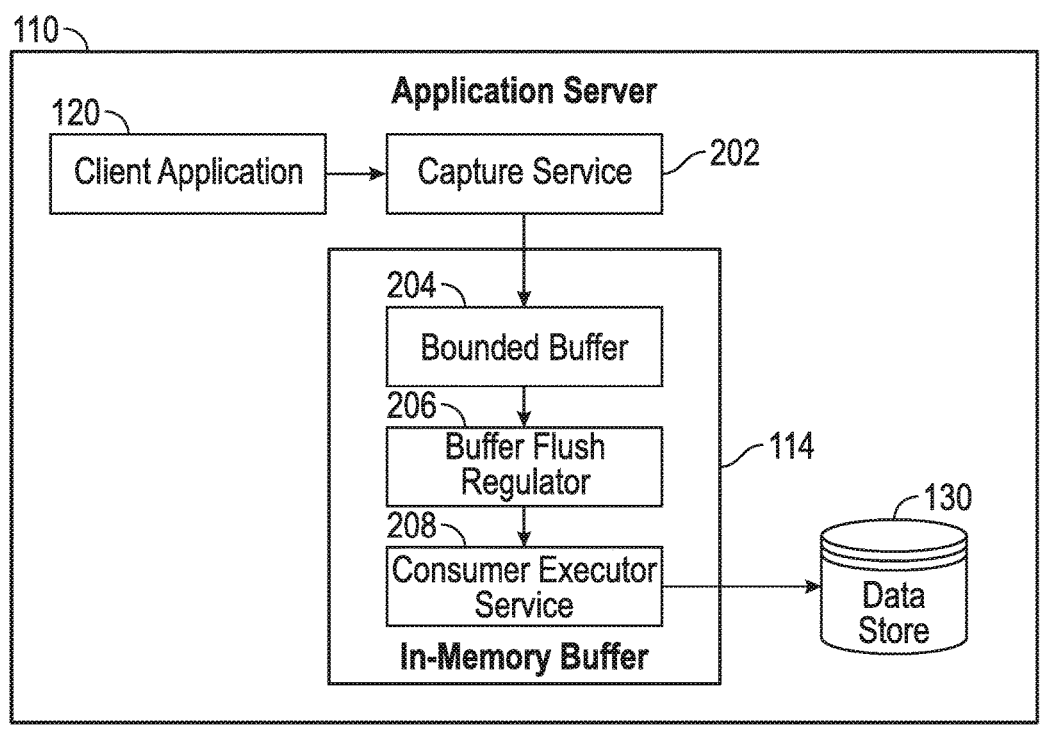
FIG. 2 is a block diagram illustrating an application server with an in-memory buffer service, according to an embodiment.

FIG. 2 is a block diagram illustrating an application server with an in-memory buffer service, according to an embodiment. As described above, application server 110 may include client application 112, in-memory buffer service 114 and data store 130. In one embodiment, data store 130 may be internal to application server 110. In another embodiment, data store 130 may be external to application server 110 and may be connected to application server 110 over a network or other connection. In other embodiments, application server 110 may include different and/or additional components which are not shown in order to simplify the description. In one embodiment, data store 130 may be embodied by one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Client application 112 may be any type of computer application program that generates events. For example, client application 112 may be an entertainment application, productivity application, business application, social networking application or other types of application. In one embodiment, in-memory buffer 114 processes events for storage in data store 130. In other embodiments, in-memory buffer 114 may process any other type of data object for storage in data store 130 or elsewhere. In one embodiment, a capture service 202 running on application server 110 receives events from client application 112 that are to be stored in data store 130. Capture service 202 temporarily stores the received events in bounded buffer 204. The bounded buffer 204 may include a plurality of single-threaded segments, to which the capture service 202 can write the events in parallel. In one embodiment, bounded buffer 204 may include 16 single-threaded segments, each of which can be written in parallel with a different event generated by client application 112. The size of bounded buffer 204 is configurable according to the particular implementation. In one embodiment, the buffer size may be approximately 10 megabytes (MB) to 20 MB. In other embodiments, the buffer may have a different size, such as 1 MB, 50-100 MB, 1 terabyte (TB), etc.).

In one embodiment, in-memory buffer service 114 further includes a buffer flush regulator 206. Buffer flush regulator 206 controls when bounded buffer 204 is emptied (i.e., "flushed") for consumption by consumer executor service 208 and storage in data store 130. In one embodiment, logic associated with bounded buffer 204 monitors the load on bounded buffer 204 and provides a notification to the buffer flush regulator 206 when the number of events stored in the bounded buffer 204 reaches a predefined limit (e.g., 80% full) or when a predefined amount of time has passed since a contents of the bounded buffer 204 was written to data store 130 (e.g., 10 seconds). In one embodiment, consumer executor service 208 periodically sends a request for buffer flushing to buffer flush regulator 206. Buffer flush regulator 206 determines whether a notification has been received from bounded buffer 204 indicating that either the predefined size limit or the predefined time limit has been reached. If not, buffer flush regulator 206 delays the request. This way, if the buffer flush regulator 206 has not received any notification from single-threaded segments 302, then buffer flush regulator 206 make the request for buffer flushing from the consumer executor service 208 to wait until it either gets notification or the time delay is over. If the notification has been received, buffer flush regulator 206 grants the request and consumer executor service 208 may consume the events in the bounded buffer 204 using a dynamically sized thread pool of consumer threads to read the segments of the bounded buffer 204 in parallel. By consuming the events, consumer executor service 208 reads the events from bounded buffer 204 and writes the events to data store 130.

In some situations, all of the segments of bounded buffer 204 may be filled with events and new events are received by capture service 202 before buffer flush regulator 206 can empty the contents of bounded buffer 204. Bounded buffer 204 may handle this situation in a number of different ways according to a defined overflow policy. In one embodiment, bounded buffer 204 may implement a "keep latest" overflow policy where the oldest event in bounded buffer 204 is overwritten with the newly received event from client application 112. In another embodiment, bounded buffer 204 may implement a "drop latest" overflow policy, where the newly received event is prevented from being stored in bounded buffer 204.

Figure 3:
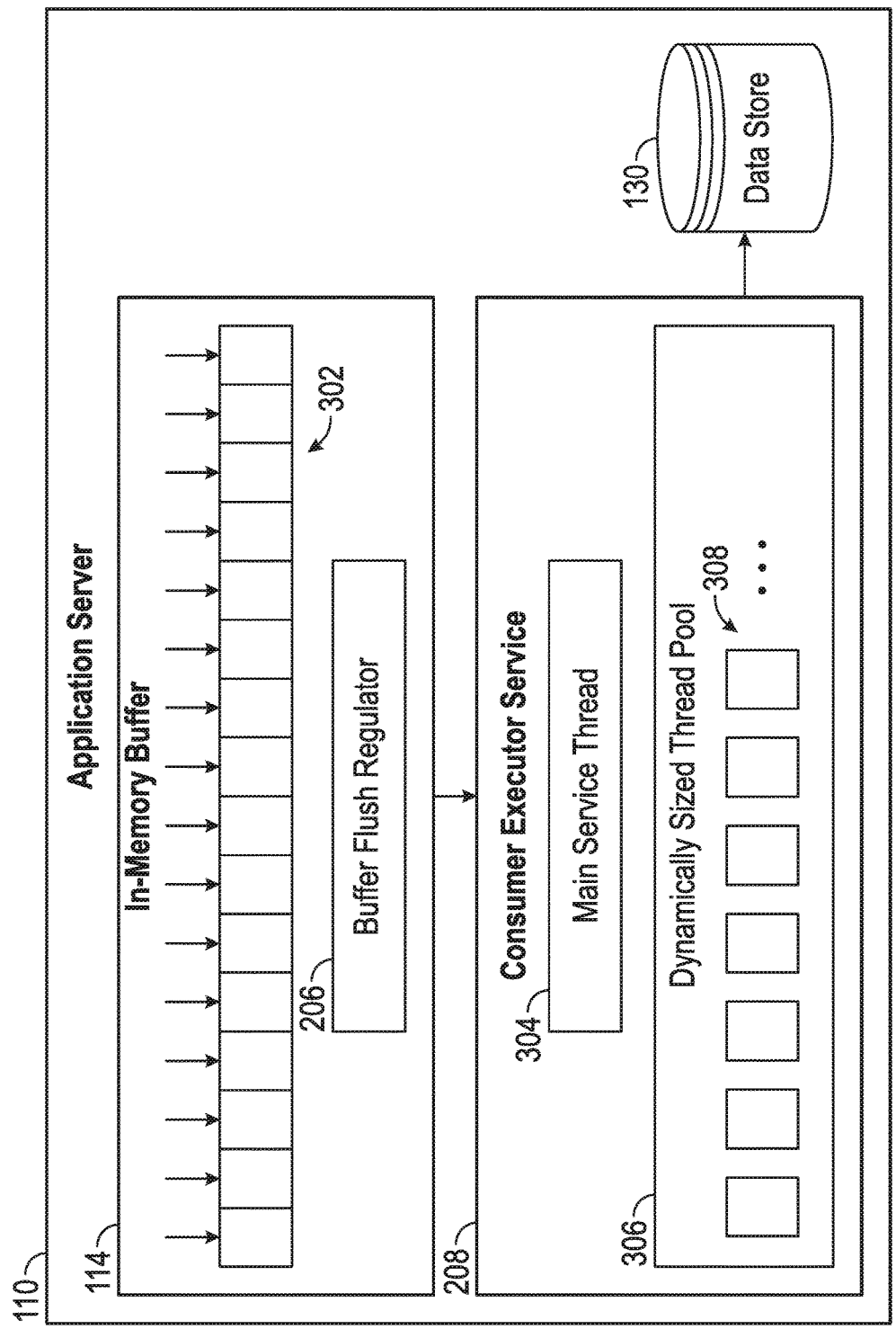
FIG. 3 is a block diagram illustrating an application server with an in-memory buffer service, according to an embodiment.

FIG. 3 is a block diagram illustrating an application server with an in-memory buffer service, according to an embodiment. In one embodiment, application server 110 includes in-memory buffer service 114 and consumer executor service 208. In one embodiment, consumer executor service 208 may be part of in-memory buffer service 114; however, in another embodiment, consumer executor service 208 may be a separate, standalone, service. In one embodiment, an in-memory bounded buffer utilized by the in-memory buffer service 114 includes a plurality of single-threaded segments 302, to which capture service 202 can write the events in parallel. In one embodiment, the bounded buffer may include 16 single-threaded segments 302, each of which can be written in parallel with a different event or other data object. In other embodiments, the bounded buffer may have some other number of segments, including more or less than 16 segments.

In one embodiment, in-memory buffer service 114 further includes buffer flush regulator 206. Buffer flush regulator 206 controls when bounded buffer 204 is emptied (i.e., "flushed") for consumption by consumer executor service 208 and storage in data store 130. In one embodiment, in-memory buffer service 114 monitors the load on the buffer segments 302 and provides a notification to the buffer flush regulator 206 when a certain portion or percentage of the buffer segments 302 are full (e.g., 80% full) or when a predefined amount of time has passed since a contents of the buffer segments 302 were flushed (e.g., 10 seconds). In one embodiment, a main service thread 304 in consumer executor service 208 may periodically send a request for buffer flushing to buffer flush regulator 206. Buffer flush regulator 206 may determine whether a notification has been received from bounded buffer 204 indicating that either the predefined size limit or the predefined time limit have been reached. If not, buffer flush regulator 206 delays the request. If the notification has been received, buffer flush regulator 206 grants the request and consumer executor service 208 may consume the events in the bounded buffer 204 using a dynamically sized thread pool 306 of consumer threads 308 to read the segments of the bounded buffer 204 in parallel. Dynamically sized thread pool 306 can add or remove consumer threads 308 so that the number of consumer threads 308 matches the number of buffer segments 302 being consumed. For example, if all 16 segments 302 are being read, dynamically sized thread pool 306 can have 16 consumer threads 308. If, however, only 8 buffer segments 302 contain events, then thread pool 306 need only include 8 threads 308. The consumer threads 308 read the events from buffer segments 302 in parallel and write the events to data store 130.

Figure 4:
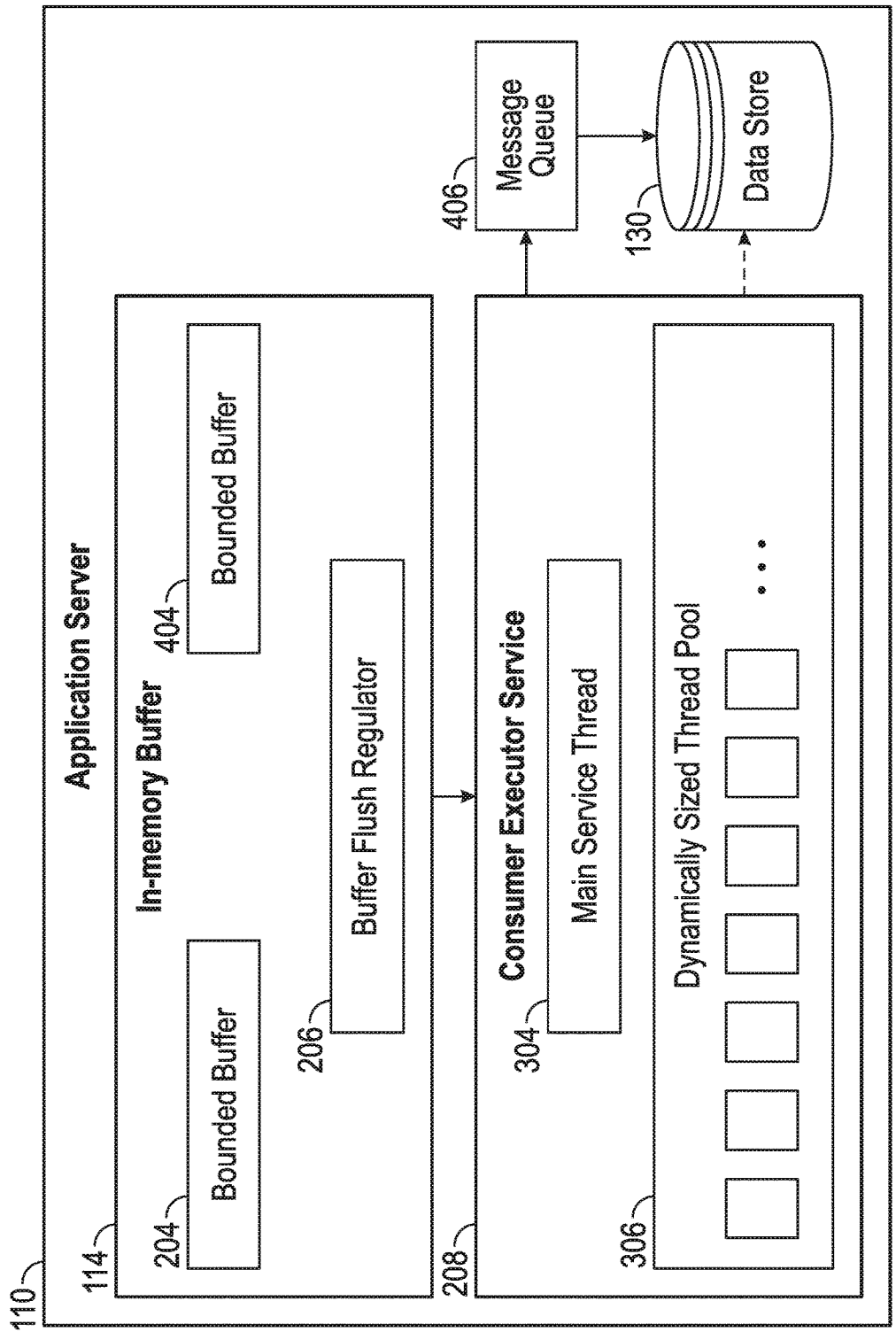
FIG. 4 is a block diagram illustrating an application server with dual in-memory bounded buffers, according to an embodiment.

FIG. 4 is a block diagram illustrating an application server with dual in-memory bounded buffers, according to an embodiment. In one embodiment, application server 110 includes in-memory buffer service 114 and consumer executor service 208. In one embodiment, in-memory buffer service 114 utilizes two or more bounded buffers 204, 404 to buffer events received from a client application. In one embodiment, each bounded buffer 204, 404 may include a plurality of single-threaded segments, each of which can be written in parallel with a different event or other data object. The dual bounded buffers 204, 404 can be used alternately to prevent a service interruption. For example, once bounded buffer 204 has been filled with event data and is in the process of being flushed by consumer executor service 208, additional events may be received from the client application or other source. Since bounded buffer 204 is not available, those new events cannot be stored in bounded buffer 204. Instead, bounded buffer 404 may be utilized to store the newly received events. Bounded buffer 404 can function as the current buffer, storing new events until it is ready to be flushed. Buffer flush regulator 206 can initiate a flush of bounded buffer 404 using the same conditions described above with respect to bounded buffer 204. Once bounded buffer 404 is flushed, in-memory buffer service 114 can return to using bounded buffer 204 as the current buffer. The process can repeat, alternating between the available buffers to prevent service interruption and the loss of any event data. In other embodiments, there may be more than two bounded buffers which are cycled through in a similar fashion. For example, a given server, may have three, four, or more buffers available. In one embodiment, a server may initially have some number of buffers (e.g., two), but additional buffers may be allocated as the need arises. Thus, if event data is being received at a rate that cannot be serviced using the current number of buffers, the in-memory buffer service or other logic may allocate additional buffers in order to accommodate the higher volume of events.

Under normal operation the threads of the dynamically sized thread pool 306 in consumer executor service 208 may write the events read from either bounded buffer 204 or bounded buffer 404 directly to data store 130. Depending on the implementation, however, the data store 130 may be a distributed system and possibly take a significant period of time to be written. In such a case, or if all or a portion of the data store 130 is temporarily unavailable, consumer executor service 208 may enqueue the events from the bounded buffer 204 or 404 in a message queue 406 for subsequent writing to data store 130 after data store 130 becomes available. In one embodiment, consumer executor service 208 may first try to write directly to data store 130, but if data store 130 does not respond within some period of time, message queue 406 may be utilized. Message queue 406 may be any available in-memory or out-of-memory data structure that can temporarily accommodate the events before they are stored in data store 130. In one embodiment, message queue 406 may be large enough to store the contents of one bounded buffer 204 at a time. In another embodiment, message queue 406 may be large enough to store the contents of multiple buffers concurrently.

Figure 5:
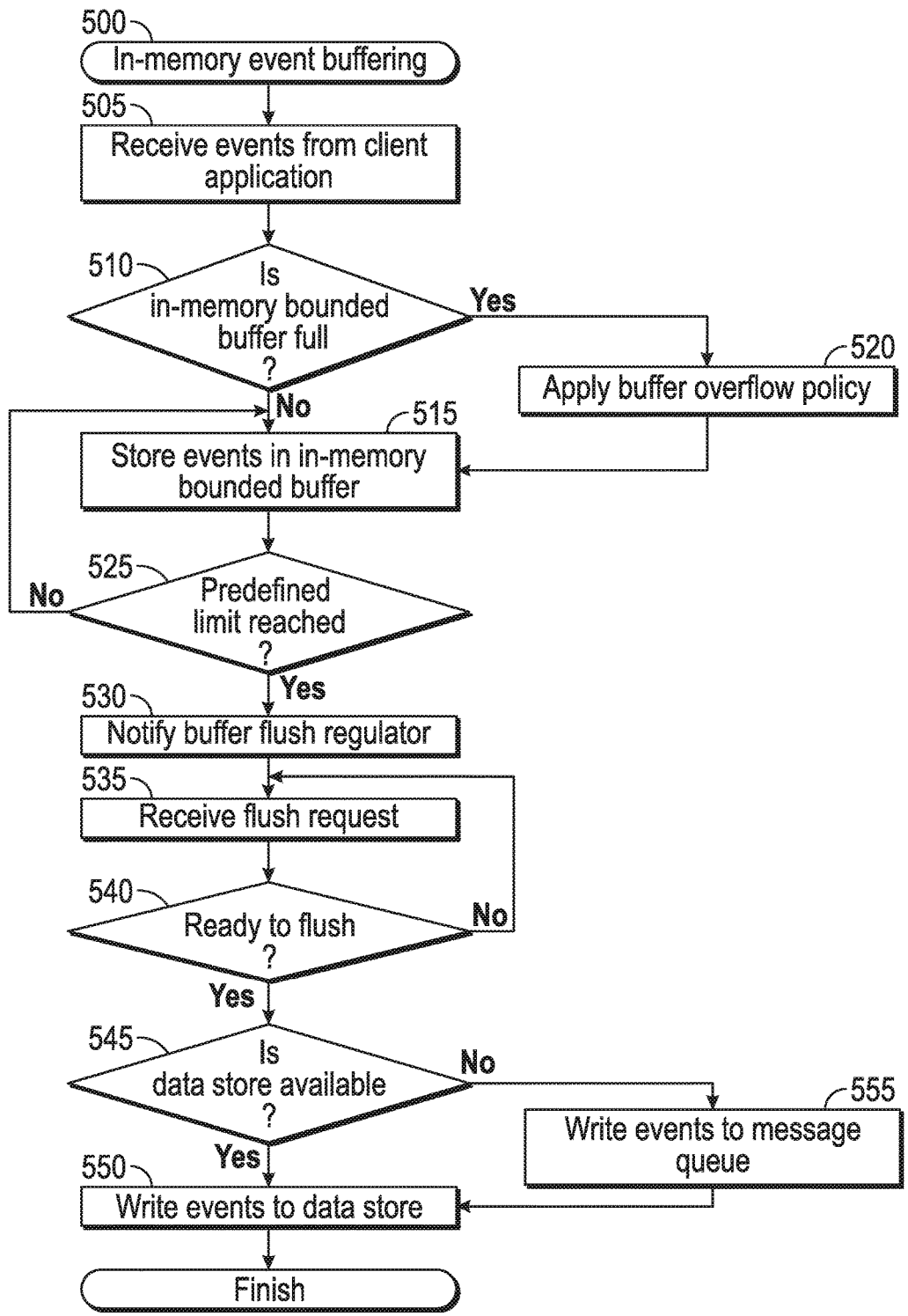
FIG. 5 is a flow diagram illustrating a method for in-memory buffering of event data, according to an embodiment.

FIG. 5 is a flow diagram illustrating a method for in-memory buffering of event data, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to receive event data for storage in a data store and buffer the event data in an in-memory bounded buffer prior to storage in the data store. In one embodiment, method 500 may be performed by in-memory buffer service, as shown in FIGS. 1-4.

Referring to FIG. 5, at block 505, method 500 receives events from client application 112. In one embodiment, a capture service 202 running on application server 110 receives events from client application 112 that are to be stored in data store 130. In another embodiment, capture service 202 may receive generic data objects from some other source for in-memory buffering.

At block 510, method 500 determines whether in-memory bounded buffer 204 is full. In one embodiment, bounded buffer 204 may include 16 single-threaded segments, each of which can be written in parallel with a different event generated by client application 112. In one embodiment, in-memory buffer service 114 determines whether each of the buffer segments has been written with an event. If each segment contains an event, then in-memory buffer service 114 determines that the bounded buffer 204 is full. If there are one or more segments of the bounded buffer 204 that do not contain events, then in-memory buffer service 114 determines that the bounded buffer 204 is not full.

If in-memory bounded buffer 204 is not full, at block 515, method 500 stores the received events in the in-memory bounded buffer 204. In one embodiment, capture service 202 writes the received events to one or more of the segments 302 of in-memory bounded buffer 204 in parallel.

If in-memory bounded buffer 204 is full, at block 520, method 500 applies a buffer overflow policy prior to storing the events. In one embodiment, bounded buffer 204 may implement a "keep latest" overflow policy where the oldest event in bounded buffer 204 is overwritten with the newly received event from client application 112. In another embodiment, bounded buffer 204 may implement a "drop latest" overflow policy, where the newly received event is prevented from being stored in bounded buffer 204.

At block 525, method 500 determines if a predefined limit has been reached. In one embodiment, in-memory buffer service 114 monitors the load on bounded buffer 204 and determines when the number of events stored in the bounded buffer 204 reaches a predefined limit (e.g., 80% full) or when a predefined amount of time has passed since a contents of the bounded buffer 204 was written to data store 130 (e.g., 10 seconds). If the predefined limit has been reached, at block 530, method 500 provides a notification to buffer flush regulator 206. In one embodiment, in-memory buffer service 114 provides the notification to buffer flush regulator 206.

At block 535, method 500 receives a buffer flush request from consumer executor service 208. In one embodiment, consumer executor service 208 may periodically send a request for buffer flushing to buffer flush regulator 206. The period with which the request is sent can be configurable depending on the particular implementation.

At block 540, method 500 determines whether the in-memory bounded buffer 204 is ready to be flushed. Buffer flush regulator 206 may determine whether a notification has been received from bounded buffer 204, at block 530, indicating that either the predefined size limit or the predefined time limit have been reached. If not, buffer flush regulator 206 denies the request.

If the in-memory bounded buffer 204 is ready to be flushed, at block 545, method 500 determines whether the data store 130 is available. Depending on the implementation, the data store 130 may be a distributed system and possibly take a significant period of time to be written. In such a case, all or a portion of the data store 130 may be temporarily unavailable.

If the data store 130 is available, at block 550, method 500 consumes the events from the in-memory bounded buffer 204 by writing the events directly to the data store 130. In one embodiment, consumer executor service 208 may consume the events in the bounded buffer 204 using a dynamically sized thread pool of consumer threads to read the segments of the bounded buffer 204 in parallel. By consuming the events, consumer executor service 208 reads the events from bounded buffer 204 and writes the events to data store 130.

If the data store is not available, at block 555, method 500 enqueues the events from in-memory bounded buffer 204 in a message queue 406 for subsequent writing to the data store 130 after the data store 130 becomes available. Message queue 406 may be any available in-memory or out-of-memory data structure that can temporarily accommodate the events before they are stored in data store 130. In one embodiment, message queue 406 may be large enough to store the contents of one bounded buffer 204 at a time. In another embodiment, message queue 406 may be large enough to store the contents of multiple buffers concurrently.

Because the in-memory buffer service is implemented in memory, it is inherently lossy. For example, if the application server 110 crashes, then objects/events that the server 110 is holding in memory (and that have not been written to the data store 130) can be lost. To help address this issue, the IMBS can implement the message queue 310 to improve reliability as described above.

However, due to limits in scalability, the reliability of the message queue 310 can be somewhat limited. The MQ 310 operates as a message queue backed by a large relational/transactional data store 130 with guaranteed message delivery. Enqueuing events in the MQ 310 can have relatively high latency. This can be problematic when the number of events has a high-volume (e.g., on the order of 200+ millions events per day). Because of high latency during high load time, the buffer can starts to overflow since worker threads of consumer executor service are busy with events enqueuing. For instance, when the consumer 208 does not finish in a given time and the buffer 114 starts to overflow.

Further, in some situations, the data store 130 may not be available. For example, the data store 130 might undergo upgrades or other maintenance tasks that make it unavailable such that events cannot be written, which reduces reliability of the system. According to one estimate, when the large data store 130 is unavailable, IMBS could potentially drop up to 80% of events.

These issues can be problematic and unacceptable in certain use cases or environments, for instance, in compliance use cases where auditors want to know about access (e.g., where it is necessary to track events such as who exported the customer list). Thus, although IMBS has many benefits, it would be desirable to improve reliability of the IMBS. To address these issues, the in memory buffer service illustrated in FIG. 3 can be modified as shown in FIG. 6.

Figure 6:
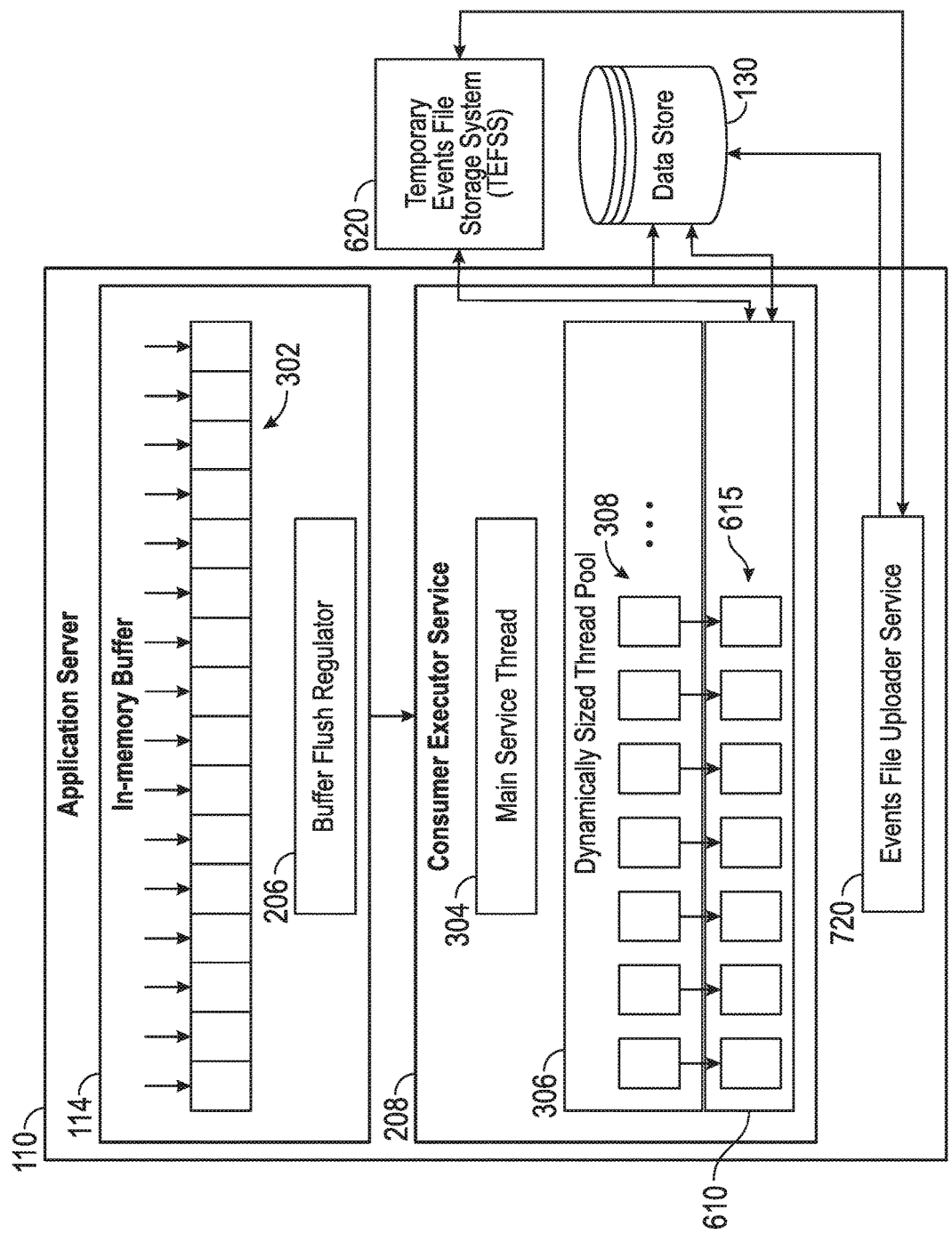
FIG. 6 is a block diagram illustrating an application server with an in-memory buffer service according to another embodiment.

FIG. 6 is a block diagram illustrating an application server 110 with an in-memory buffer service according to another embodiment. FIG. 6 also illustrates a data store 130 that is configured to store events in an event table 920, and a temporary events file storage system (TEFSS) 620 that are external to the application server 110. In contrast FIG. 3, FIG. 6 includes three additional elements namely an indirect events writer 610, an events file uploader service 720 and the TEFSS 620 that can help improve reliability of the IMBS. As will be explained in greater detail below, the TEFSS 620 can temporarily store groups of events (generated by a client application 120 that runs at the application server 110) as events files for subsequent writing of the events to the data store 130. In addition, minor modifications are also made at the data store 130 as will be described below.

When the consumer threads 308 are unable to write events directly to the event table 920 at the data store 130 within a certain time, the indirect events writer 610 can be invoked. The indirect events writer 610 includes a dynamically sized thread pool of event capture threads 615. Each event capture thread 615 can create an events file that includes events from a corresponding consumer thread 308. Each event capture thread 615 can temporarily write the events, in batches, as events files, to the TEFSS 620. For example, each event capture thread 615 can serialize multiple events into events files that can then be temporarily stored at the TEFSS 620.

The events file uploader service 720 is a separate daemon thread running in the application server 110. The events file uploader service 720 can retrieve, based on job detail information metadata stored in an events uploader job detail table (not illustrated) at the data store 130, the events files from the TEFSS 620, and then write/upload the events from each of those retrieved events files to an event table (not illustrated) at the data store 130 at a later time.

By adding a secondary storage option, the TEFSS 620, the event capture capability of the IMBS can be improved by significantly reducing loss of events without creating additional latency. For instance, in one implementation, it has been observed that the improved IMBS can reduce the 80% loss (described above) down to 0.02% loss without introducing additional latency. The temporary events file storage system (TEFSS) 620 can help solve the scalability problem with MQ 310 because the TEFSS 620 is not backed by a large relational/transactional data store 130, and is not transactional in nature. Rather, the TEFSS 620 operates as a separate file storage system that provides much higher throughput and lower latency. To explain further, the TEFSS 620 is a data store that can store unstructured data as files (e.g., that contain arbitrary and possibly unrelated data with no ordering, or organizing structure required). In contrast to the MQ 310, the TEFSS 620 provides much higher throughput, and has much lower latency. Moreover, the TEFSS 620 is available to write regardless of whether the tenant database is in read-only mode, which increases reliability of the system. To explain further, the MQ relies on the tenant database to persist its metadata and data. If the tenant database is in read only mode (e.g., during an upgrade), events cannot be enqueued. By contrast, the TEFSS 620 does not go into a read-only mode so events can be enqueued anytime.

Figure 7A:
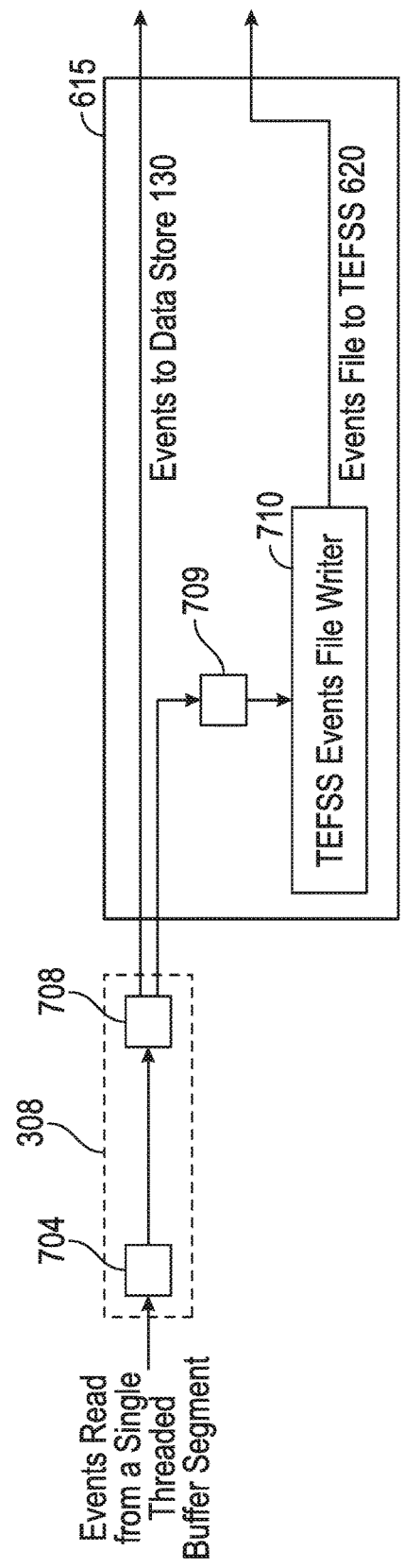
FIG. 7A is a block diagram illustrating one instance of a consumer thread and an event capture thread of FIG. 6 according to an embodiment.

FIG. 7A is a block diagram illustrating one instance of a consumer thread 308 and an event capture thread 615 of FIG. 6 according to an embodiment. Due to space constraints in FIG. 7, only one instance of the consumer thread 308 and the event capture thread 615 are illustrated; however, it is to be appreciated from FIG. 6 that there can be multiple instances of each that execute in parallel at any particular time. FIG. 7 will be described with reference to FIGS. 8-12C. As illustrated in FIG. 7A, the consumer thread 308 includes an events reader 704 and a direct events writer 708. The event capture thread 615 includes an invoker 709 and a TEFSS events file writer 710. The events reader 704, direct events writer 708 and the invoker 709 are consumers in a "consumer framework" of the consumer executor service 208. To explain further, as described above, the consumer executor service 208 is an execution engine that is responsible for reading events from in-memory buffer 114, and managing how many worker threads will run. The consumer framework provides the logic to determine what to do with events read from in-memory buffer 114. To explain further, the consumer executor service 208 passes the events read from in-memory buffer 114, in batches, to the consumer framework, and worker threads provide an execution engine to the consumer framework. As will be described in greater detail below, the consumer framework is a management system for the consumers and specifies the order in which each of the consumers will be executed to process the events.

As described above with reference to FIGS. 1-5, the capture service 202 receive events from the client application 120 running on the application server, and provides the events to the in-memory buffer service 114. The in-memory buffer service 114 temporarily holds the events in a bounded buffer 204 that is implemented in physical memory at the application server. The bounded buffer includes a plurality of single-threaded buffer segments 302 that are each configured to temporarily hold some of the events received from the capture service 202 until a flush operation is performed. The buffer flush regulator 206 will perform a flush operation at regular intervals, for example, once every 10 seconds to flush the in-memory buffer 114. The consumer executor service 208 includes a dynamically sized thread pool of consumer threads that execute in parallel. Each of consumer threads 308 corresponds to a particular single-threaded buffer segment 302. When the flush operation occurs, events stored in one of the buffer segments 302 are then passed to a corresponding consumer thread 308.

Each consumer thread 308 can include an instance of an events reader 704 that reads events flushed from a corresponding one of the single-threaded buffer segments 302 (FIG. 6), assigns a unique identifier to each event that will be used at the data store 130, adds that unique identifier to each event, and then passes a result to the direct events writer 708. Each consumer thread 308 can include an instance of a direct events writer 708 is designed to write the events directly to the data store 130. In most scenarios, the direct events writer 708 can successfully write the events received from the events reader 704 directly to the data store 130. However, in some cases, the direct events writer 708 cannot write the events directly to the data store 130. For example, the data store 130 can have periods of lower responsiveness. For instance, in some cases, as the data gets written to the data store 130, there are maintenance tasks (e.g., such as splitting storage units (regions) as they get too large for a given storage unit (region)). Another example would be periodic re-organization of data (or compaction) which takes care of things like deleted records.

To provide additional reliability in situations where the direct events writer 708 is unable to successfully write events to the data store 130, the indirect events writer 610 provides a number of event capture threads 615 corresponding to each of the consumer threads 308. Each event capture thread 615 includes an instance of an invoker 709 and an instance of an events file writer 710. Each invoker 709 can determine if a corresponding instance of the direct events writer 708 was able to successfully write events (that it read from a particular single-threaded buffer segment 302) to an event table at the data store 130. Each invoker 709 also receives the events from a particular single-threaded buffer segment 302 via the direct events writer 708. When an invoker 709 determines that the corresponding instance of the direct events writer 708 was unable to successfully write events directly to the data store 130 (e.g., invoker 709 receives an indication that the direct events writer 708 is unable or has failed to write events to the data store 130), the invoker 709 invokes an instance of the TEFSS events file writer 710 at that event capture thread 615. The invoker 709 will then communicate the events to the TEFSS events file writer 710, which serializes events from the particular single-threaded buffer segment 302 into a single events file, and then writes the events file to the TEFSS 620. Examples of events files stored at the TEFSS 620 are illustrated in FIG. 8.

Figure 8:
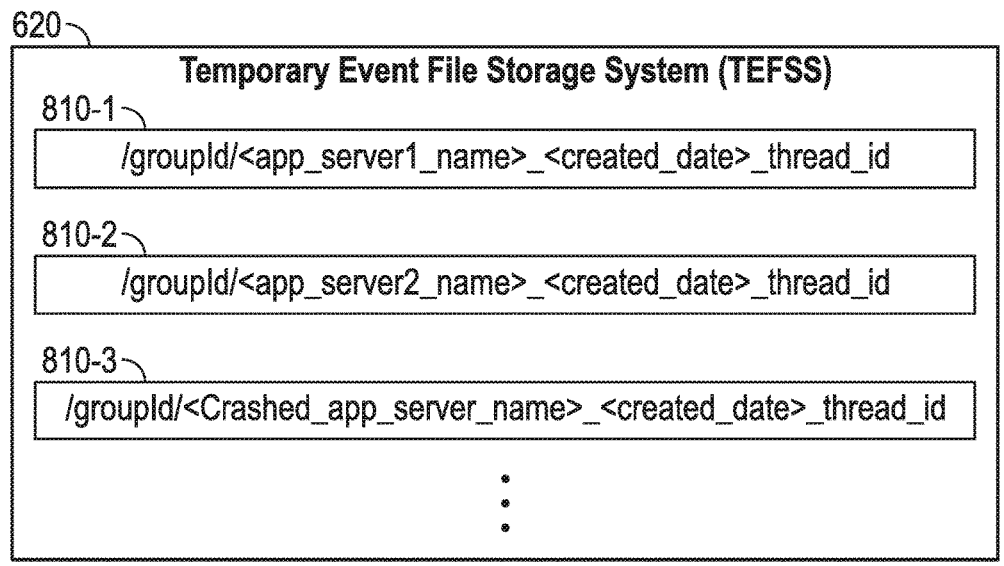
FIG. 8 is a block diagram illustrating an exemplary implementation of the temporary events file storage system (TEFSS) of FIG. 6 according to an embodiment.

FIG. 8 is a block diagram illustrating an exemplary implementation of the TEFSS 620 of FIG. 6 according to an embodiment. As illustrated in FIG. 8, the TEFSS 620 can store a plurality of events files 810-1 . . . 810-3.

Each events file 810 written to the TEFSS 620 by the TEFSS events file writer 710 can include a group identifier (/group ID/) that uniquely identifies a group of events files that were generated during a particular time window, a file name (not explicitly labeled in FIG. 8), and file information (not illustrated in FIG. 8). The file name can include an application server name (<app_serverX_name> of the application server that generated the events in the events file, a creation date (<create_date>) for each of the events in the events file, where the creation date is specified as events for Mmddyyyy-HHmm; SSS (where MM is the month, dd is the day, yyyy is the year, HH is the hour, mm is the minutes and SSS is the second when the events file was created), and a thread identifier (thread_ID) that specifies the name of the event capture thread writing the events file. The group ID identifies the group that the events file uploader service 720 inspects to identify an events file to process. A new group identifier (/group ID/) for each events file 810 can be generated at regular intervals, for example, once every 10 minutes in an implementation where separate events files 810 are generated once every ten minutes. The application server name (<app_serverX_name>, the creation date (<create_date>) and the thread identifier (thread_ID) make up the file name for the particular events file. The file information in each events file 810 can include a file type (e.g., Gzip File) and events that are serialized using standard approaches for serializing objects or a collection of objects, for example, such as a JSON format, Avro, or protocol buffer in accordance with some exemplary implementations.

Figure 7B:
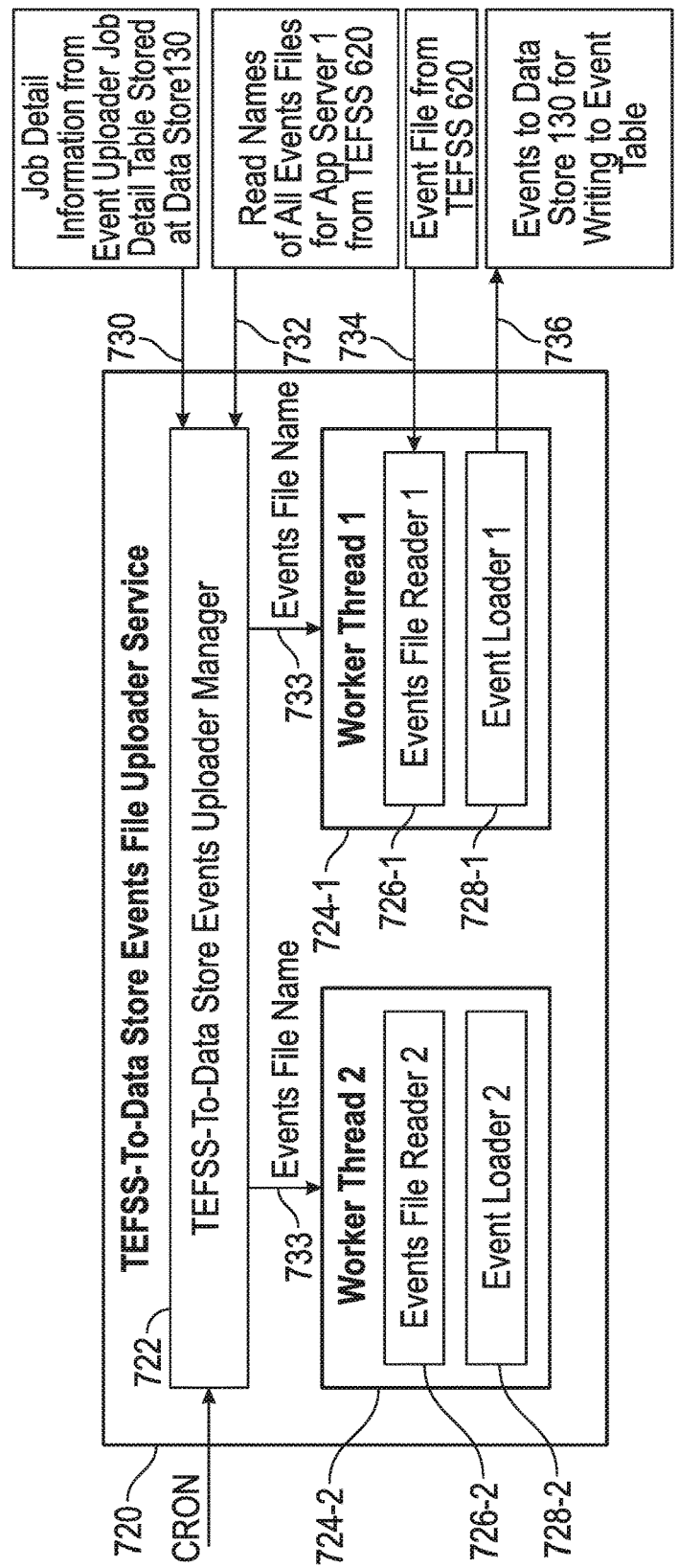
FIG. 7B is a block diagram illustrating an events file uploader service of FIG. 6 according to an embodiment.

FIG. 7B is a block diagram illustrating an events file uploader service 720 of FIG. 6 according to an embodiment. The events file uploader 720 is responsible for retrieving the events file from the TEFSS 620 and uploading the events to the data store 130 in a reliable manner. The events file uploader 720 includes an events uploader manager 722 and a plurality of worker threads 724. Although only two instances of worker threads 724 are illustrated in FIG. 7 due to space constraints, it should be appreciated that a practical implementation the events file uploader 720 can be multi-threaded and that the events uploader manager 722 can instantiate any number of worker thread 724 instances needed to process any number of events files 810. The events uploader manager 722 creates and maintains uploader job records that are stored in the events uploader job detail table at the data store 130. Each uploader job record points to a particular events file 810 stored at the TEFSS 620. As will be described in greater detail below, the events uploader manager 722 instantiates one instance of a worker thread 724 for each events file name that the events uploader manager 722 retrieves from the TEFSS 620.

Figure 9:
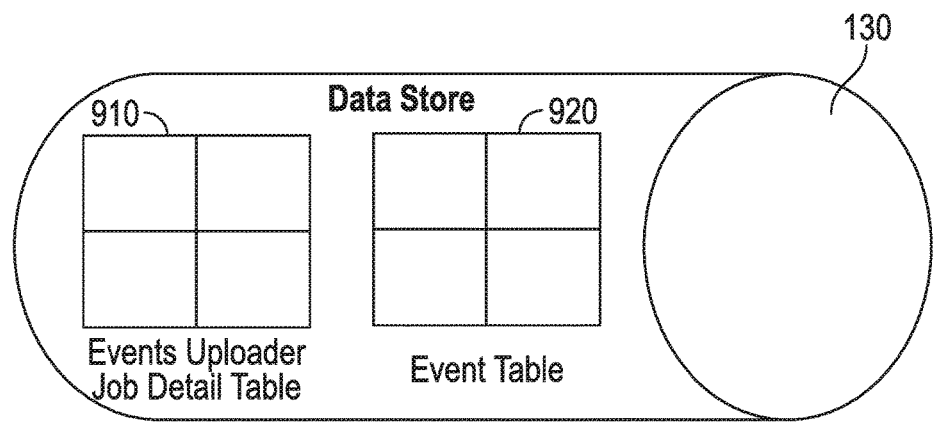
FIG. 9 is a block diagram illustrating an exemplary implementation of the data store of FIG. 6 according to an embodiment.

FIG. 9 is a block diagram illustrating an exemplary implementation of the data store 130 of FIG. 6 according to an embodiment. The data store 130 includes an events uploader job detail table 910 and an event table 920. The events uploader job detail table 910 includes a number of rows (only two rows are shown in FIG. 9 for simplicity of illustration). Each row of the events uploader job detail table 910 is used to store an uploader job record that includes job detail information that points to a particular events file 810. The events uploader manager 722 creates and maintains each of the uploader job records that are stored in the uploader job detail table 910. As will be explained in more detail below, the events file uploader service 720 can use job detail information from the uploader job records to retrieve particular events files associated with those particular uploader job records. On the other hand, the event table 920 is the destination where events are eventually stored after they are retrieved by the events file uploader service 720 from the TEFSS 620, and uploaded by the events file uploader service 720 to the event table 920 of the data store 130. An example of the events uploader job detail table 910 is illustrated in FIG. 10.

FIG. 10 is a data structure diagram illustrating a schema used for each uploader job record that is stored at the events uploader job detail table 910 according to an embodiment. As noted above, information in each row of the events uploader job detail table 910 (FIG. 9) is referred to herein as an "uploader job record." A single row 1010 is illustrated in FIG. 10 for simplicity. Each uploader job record 1010 stores job detail information related to a particular events file that the TEFSS events file writer 710 has written to the TEFSS 620.

In the non-limiting embodiment that is illustrated in FIG. 10, an uploader job record 1010 for an events file includes various columns of metadata that include, but are not limited to: a cluster identifier (<Cluster ID>) that uniquely identifies a collection of instances that a grouped as a cluster of application servers, an instance identifier (<instance_id>) that uniquely identifies a collection of application servers grouped as an instance, an application server name (<app_server_name>) of a particular application server, a group identifier (<group ID>) that uniquely identifies a group of events files that were generated during a particular time window, a file name (<file_name>) of the particular events file, a job started date (<job_started_date>) that specifies when the particular events file was created, a number of events (<Num_Events>) that specifies a number of events for this particular events file, a number of events that specifies a number of events for this particular events file, a last updated time that indicates when the particular events file was last updated, a number of retry attempts that specifies how many times the events file uploader service 720 has attempted to process the particular events file, the job type (<job_type>) that indicates either regular or backup (, and a status that indicates either running or completed. Although not illustrated, it should be appreciated that the uploader job record 1010 for each events file can include other fields such as file size information regarding the file size of the particular events file, a time-to-live (TTL) value, etc.

An events file uploader service 720 runs on each application server of a cloud computing service provider. A particular instance of the events file uploader service 720 that runs on a particular application server of that cloud computing service provider can be identified by the combination of:
(<Cluster ID>)/(<instance_id>)/(<app_server_name>)/(<job_type>).

Each row of the events uploader job detail table 910 includes a row key that is used by an events uploader manager 722 to look up job detail information for a particular event file. A row key for a row of the events uploader job detail table 910 is defined by the combination of the instance identifier (<instance_id>), the application server name (<app_server>), the group identifier (<group ID>), the file name (<file_name>), and the job started date (<job_started_date>).

Referring again to FIG. 7B, at communication 730, the events uploader manager 722 receives or retrieves at least some of the job detail information from the events uploader job detail table 910 that is stored at the data store 130. The events uploader manager 722 is invoked with the application server name (<app_server>), the group identifier (<group ID>), and the job type (e.g., either backup or regular).

At communication 732, the events uploader manager 722 reads all of the names of events files (available for a particular application server) from the TEFSS 620. At 733, the events uploader manager 722 then assigns each of the worker threads 724 one of the events file names (i.e., assigns a file name of specific events file to one of the worker threads 724).

Each worker thread 724 includes events file reader 726 that is responsible for reading an events file 810 from the TEFSS 620, and event loader 728 that is responsible for uploading events from that events file 810 to the data store 130.

Each events file reader 726 retrieves an events file 810 from the TEFSS 620 that corresponds to particular events file name and adds a record in the events uploader job detail table 910 with current time as job started time. Each events file reader 726 then provides that events file 810 to a corresponding instance of event loader 728 that writes each event in the events file 810 to the data store 130. Specifically, event loader 728 writes each event in the events file 810 to the event table 920 of the data store 130, and then updates the record in the events uploader job detail table 910 with a retry attempt.

Figure 11A:
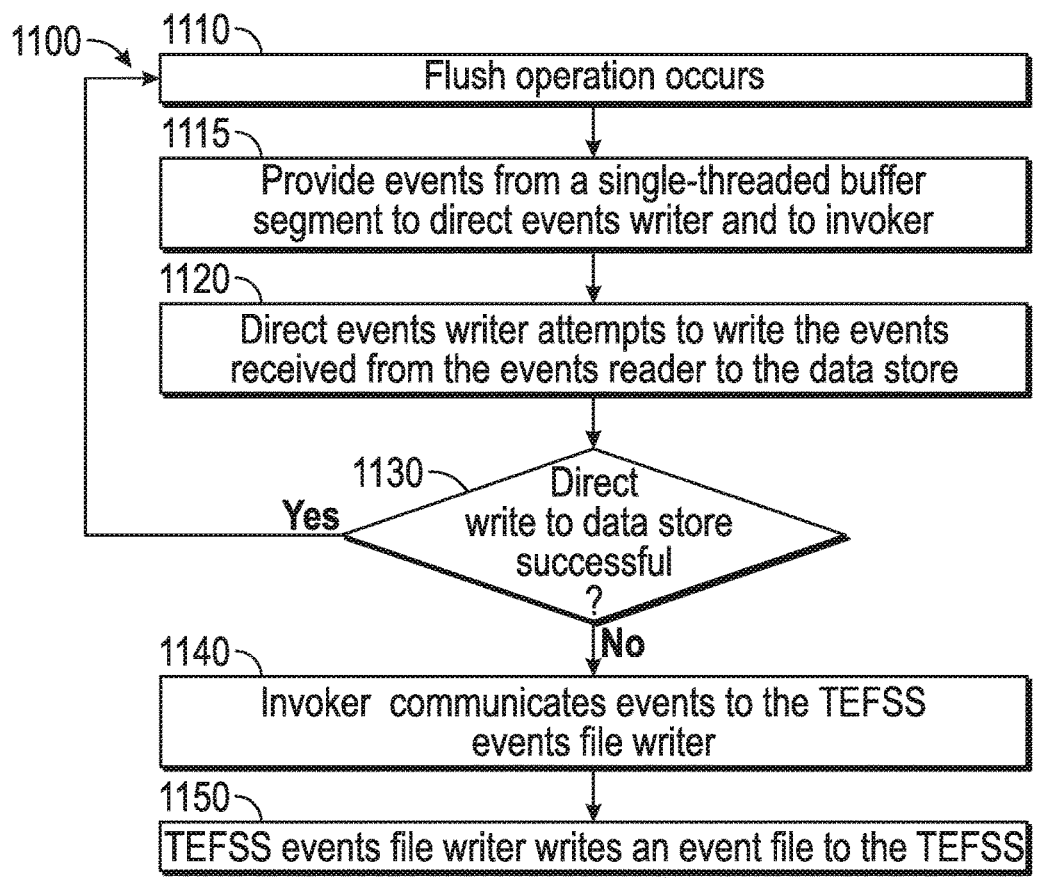
FIG. 11A is a flow diagram illustrating a method for writing events files to a temporary events file storage system (TEFSS) according to another embodiment.

FIG. 11A is a flow diagram illustrating a method 1100 for writing events files to a temporary events file storage system (TEFSS) 620 according to another embodiment. The method 1100 of FIG. 11A describes a computer-implemented method performed by an application server comprising an indirect events writer 610 that is configured to instantiate a plurality of event capture threads 615 each comprising an instance of an events file writer 710. The computer-implemented method of FIG. 11A will be described with reference to a single instance of an indirect events writer 610 of a particular application server, but it will be appreciated that each application server in the system can perform similar steps. FIG. 11A will be described with reference to FIGS. 1 through 10.

Prior to describing FIG. 11A, it is noted that, as described above with reference to FIGS. 1-6, capture service 202 receives events that are to be stored in a data store 130 from a client application 112 running on the application server 110, and temporarily stores the events in a bounded buffer 204 that is part of the in-memory buffer service 114. The bounded buffer 204 is implemented in physical memory at the application server 110, and comprises a plurality of single-threaded buffer segments 302. The single-threaded buffer segments 302 are each configured to temporarily store some of the events until a flush operation is performed by the buffer flush regulator 206.

At 1110, the buffer flush regulator 206 flushes the plurality of single-threaded buffer segments 302 of the bounded buffer 204, and the consumer executor service 208 instantiates a plurality of consumer threads 308 that each corresponds to a particular single-threaded buffer segment 302. As shown in FIG. 7A, each consumer thread 308 includes an instance of an events reader 704 and an instance of a direct events writer 708. The buffer flush regulator 206 can perform the flush operation at regular intervals, for example, once every 10 seconds to flush the in-memory buffer 114, and events from one of the buffer segments 302 are then passed to the consumer thread 308.

At 1115, the events reader 704 of each consumer thread 308 reads the events flushed from the particular single-threaded buffer segment that corresponds to that consumer thread 308, and each direct events writer 708 adds an identifier to each event, and then passes a result to a direct events writer 708, which is designed to write the events directly (i.e., without any intermediate storage or processing steps) to the data store 130.

At 1120, each direct events writer 708 attempts to directly write each event it has received to the data store 130.

As shown in FIG. 7A, each of the event capture threads 615 includes an instance of an invoker 709 and an instance of a TEFSS events file writer 710.

At 1130, each invoker 709 can determine if its corresponding direct events writer 708 was able to successfully write events (that were read from the particular single-threaded buffer segment 302) directly to the event table 920 at the data store 130 within constraints imposed. These constraints can be any combination of time-based, attempt-based, failure-based, error-based measures that indicate that the direct events writer 708 was unable to write events to the data store 130.

In many "normal" operational scenarios, the direct events writer 708 can successfully write an event directly to the event table 920 at the data store 130. In this case, the method 1100 loops to 1110. However, in some operational scenarios (described above), events cannot be written directly to the data store 130, and additional mechanisms are invoked to provide additional reliability.

Whenever an instance of an invoker 709 at one of the event capture threads 615 determines that a corresponding instance of the direct events writer 708 was unable to successfully, directly write the events directly to an event table 920 at the data store 130, the invoker invokes an instance of the TEFSS events file writer 710 at that event capture thread 615. Then at 1140, the invoker 709 communicates the events that are received from that corresponding instance of the direct events writer 708 to the TEFSS events file writer 710.

At 1150, the TEFSS events file writer 710 of each event capture thread 615 can generate a particular events file 810 that includes a plurality of events received from an in-memory buffer service 114, and then write that particular events file 810 to the TEFSS 620. The TEFSS 620 is configured to temporarily store events files for subsequent writing to the data store 130 when the data store 130 becomes available. Each instance of the TEFSS events file writer 710 can serialize the plurality of events received from the particular single-threaded buffer segment 302 into an events file. In addition, at 1150, an uploader job record at the uploader job detail table 910 (FIGS. 9 and 10).

Figure 11B:
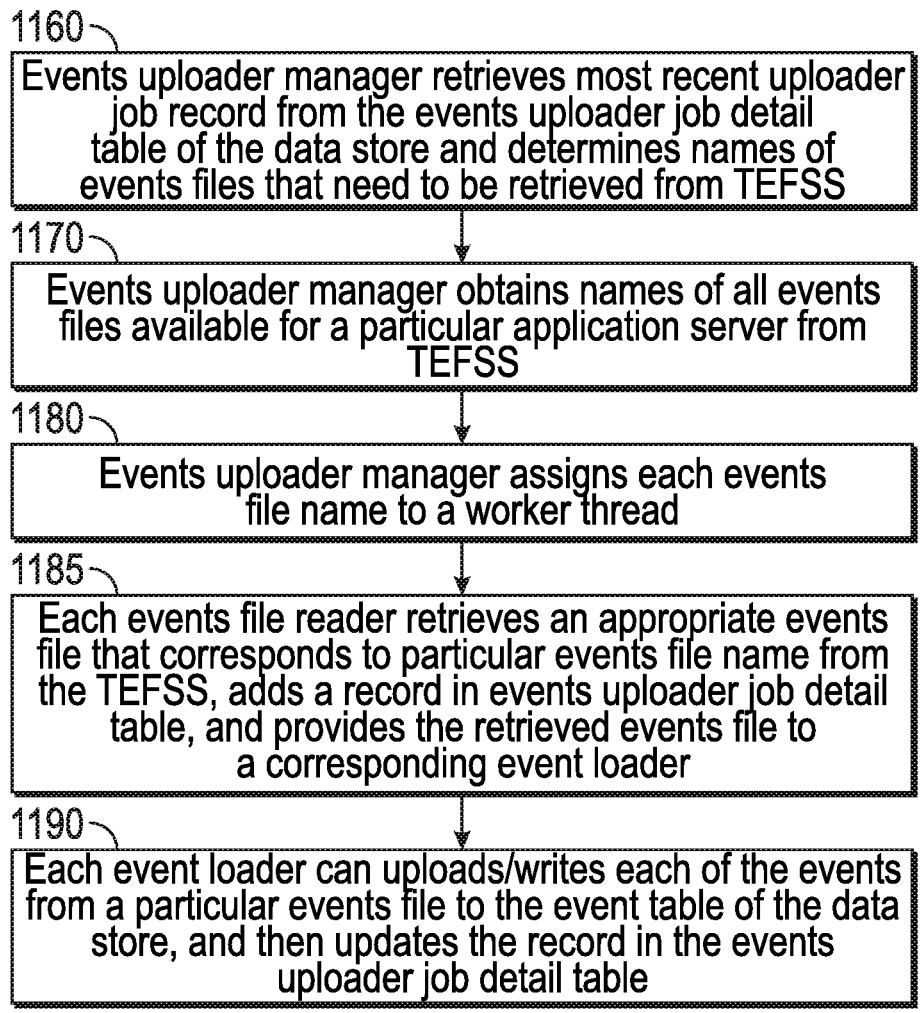
FIG. 11B is a flow diagram illustrating a method performed by an events file uploader service for transferring events files from the temporary events file storage system (TEFSS) to a data store according to another embodiment.

FIG. 11B is a flow diagram illustrating a method performed by an events file uploader service 720 for transferring events files from the temporary events file storage system (TEFSS) 620 to a data store 130 according to another embodiment. The computer-implemented method of FIG. 11B will be described with reference to a described with reference to a single instance of an events file uploader service 720 of a particular application server, but it will be appreciated that each application server in the system can perform similar steps. FIG. 11B will be described with reference to FIGS. 1-10. As illustrated in FIG. 7B, the events file uploader service 720 includes an events uploader manager 722 that maintains each of the uploader job records that are stored in the events uploader job detail table 910, and a plurality of worker threads 724.

At 1160, the events uploader manager 722 can receive or retrieve job detail information from one or more particular uploader job records (stored at the events uploader job detail table 910). Based on the job detail information retrieved, the events uploader manager 722 determines at least one events file for the application server that needs to retrieved from the TEFSS 620.

At 1170, the events uploader manager 722 can read events file names for all of the events files that are available for a particular application server from the TEFSS 620 and need to be retrieved from the TEFSS 620.

At 1180, the events uploader manager 722 can then assign each worker thread 724 a name of a particular events file. This way, each events file name(s) retrieved from the TEFSS 620 can be assigned to one instance of the worker thread 724. As described above, each worker thread 724 comprises a particular events file reader 726 and a particular event loader 728.

At 1185, each of the events file readers 726 can use the events file name to read/retrieve an appropriate events file 810 (that corresponds to particular events file name) from the TEFSS 620, and then provide the retrieved events file to a corresponding instance of the event loader 728. In addition, at 1185, the events uploader manager 722 creates an uploader job record that points to the particular events file 810 stored at the TEFSS 620, and writes the uploader job record to the events uploader job detail table 910 maintained at the data store 130. This uploader job record can include the information indicated above.

At 1190, each event loader 728 can upload/write each of the events from the particular events file 810 to the event table 920 of the data store 130. In addition, at 1190, the events uploader manager 722 updates the uploader job record at the events uploader job detail table 910 with a retry attempt. Each event loader 728 will attempt a certain number of retries in the event of a transport failure, and if the event loader 728 is unable to write events from the particular events file 810 to the event table 920, the event loader 728 will wait for a time period before retrying to write events from the particular events file 810 to the event table 920. In one, non-limiting implementation, the period between retry attempts can be set using an exponential backoff algorithm (e.g., where the period is set per a formula such as $2^{(retry-1)}*60*1000$ milliseconds).

The events file uploader service 720 can operate in a regular mode or a backup mode. The regular events file uploader service 720 runs at an application server to transfer events files created by that application server from the TEFSS 620 to the data store 130. The regular events file uploader service 720 runs continuously at the application server and does not terminate. For instance, in one embodiment, the regular events file uploader service 720 is implemented using a continuously running dameon thread.

By contrast, the backup events file uploader service 720 can run periodically or according to a schedule. For instance, in one embodiment, the backup events file uploader service 720 can be implemented as a time-based job scheduler utility that allows tasks/jobs to be automatically run at regular intervals (e.g., periodically at fixed times, dates, or intervals) by the backup daemon. The backup events file uploader service 720 runs at an application server to transfer events files that were created by another application server from the TEFSS 620 to the data store 130. This way, when an application server that is part of the cluster is unavailable (e.g., has crashed) and is unable to transfer its own events files from the TEFSS 620 to the data store 130, another application server in that cluster that is available can run the backup events file uploader service 720 to transfer events files that were created by the unavailable application server from the TEFSS 620 to the data store 130.

Embodiments of the regular events file uploader service 720 will be described below with reference to FIGS. 12A and 12B, and embodiments of the backup events file uploader service 720 will be described with reference to FIG. 12C

Figure 12A:
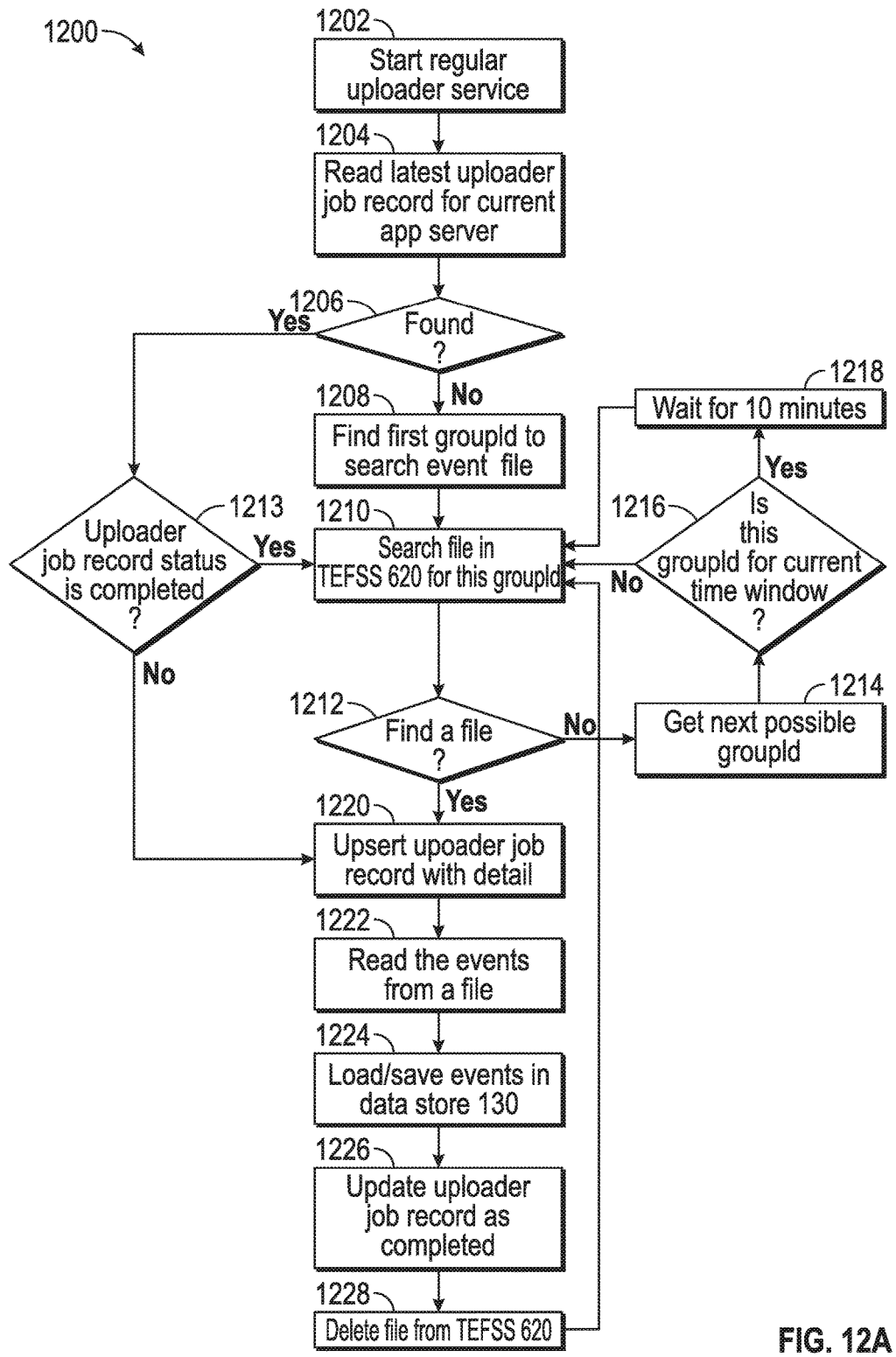
FIG. 12A is a flow diagram illustrating a method performed by the events file uploader service when operating in regular mode for transferring events files from the temporary events file storage system (TEFSS) to the data store according to another embodiment.

FIG. 12A is a flow diagram illustrating a method 1200 performed by the events file uploader service 720 when operating in regular mode for transferring events files from the temporary events file storage system (TEFSS) 620 to a data store 130 according to another embodiment.

The method 1200 begins at 1202 when the regular uploader service starts.

At 1204, the events uploader manager 722 reads the most recent uploader job record for the current application server from the events uploader job detail table 910.

At 1208, the regular events uploader manager 722 searches the most recent uploader job record for the application server for a starting group identifier that uniquely identifies a group of events files generated by the application server during a particular time window. To explain further, each group identifier is associated with a time window of a certain duration (e.g., 10 minutes). In one embodiment, the group identifier has a format: Events-MMddYYYYHHmm. The minute part (mm) represent a minute range of a certain duration. For example, if the time window is set to 10 minutes, then the group identifier can be 0, 10, 20, 30, 40 or 50. For example, a group identifier of 0 would represent that the events file was generated during a time window that spans anywhere between the start 0 up to, but not including the 10th minute, whereas a group identifier of 20 would represent that the events file was generated during a time window that spans anywhere between the start of the 20th minute up to, but not including, the 30th minute, whereas a group identifier of 50 would represent that the events file was generated during a time window that spans anywhere between the start of the 50th minute up to, but not including, the 60th minute. The significance of this is that if a group identifier has a minute part (mm) that is the same as a current time, then that group identifier is the group identifier for the current time window. One exemplary implementation of 1208 will be described in greater detail below with reference to FIG. 12B.

At 1209, the regular events uploader manager 722 determines from the most recent uploader job record whether a status for the most recent uploader job record indicates running or completed. When the status of the most recent uploader job record indicates running this means that the job is in a running state (e.g., the process which is consuming the events file has not reached the completed state, and the method 1200 proceeds from 1209 to 1220 as will be described below.

When the status of the most recent uploader job record indicates running this means that the job is in a running state (e.g., the process which is consuming the events file has not reached the completed state, and the method 1200 proceeds from 1209 to 1220, where the regular events uploader manager 722 upserts the most recent uploader job record for the application server at the events uploader job detail table 910 with updated job detail information to indicate that the regular events uploader manager 722 has started to process and read the events file. In this case, the file name is already available in uploader job record 1010. The method then proceeds to 1222 as described below.

When the status of the most recent uploader job record indicates completed this means the events file recorded in this uploader job record is processed successfully and it is time to search for and process next available events file. Therefore, when the status of the most recent uploader job record indicates completed, the method 1200 proceeds to 1210, where the regular events uploader manager 722 searches the TFESS 620 for an events file that includes the starting group identifier.

At 1212, the events uploader manager 722 determines if an events file that is associated with the starting group identifier was able to be read from the TFESS 620. When the events uploader manager 722 determines (at 1212) that an events file that is associated with the starting group identifier was not able to be read from the TFESS 620, the method proceeds to 1214, where the events uploader manager 722 determines the next available group ID that uniquely identifies another group of events files generated by the application server during another particular time window. At 1216, the events uploader manager 722 determines whether this next possible group identifier is for a current time window (or "corresponds to" the current time window).

When the events uploader manager 722 determines (at 1216) that this next possible group ID is for a current time window, then the method 1200 proceeds to 1218 where the events uploader manager 722 waits for a time period (e.g., 10 minutes) before the method 1200 loops back to 1210, where the regular events uploader manager 722 searches the TFESS 620 for an events file that includes the next possible group identifier. When the events uploader manager 722 determines (at 1216) that this next possible group ID is not for the current time window, then the method 1200 loops to 1210, where the regular events uploader manager 722 searches the TFESS 620 for an events file that includes the next possible group identifier.

When the events file that includes the starting group identifier was able to be read from the TFESS 620 (at 1212), the regular events uploader manager 722 assigns a worker thread 724 for the particular events file that was read (at 1212). The worker thread 724 includes a particular events file reader 726 and a particular event loader 728.

At 1220, the events file reader 726 upserts the most recent uploader job record for the application server at the events uploader job detail table 910 with updated job detail information. As used herein, the term "upserting" refers to a combination of updating (i.e., refreshing an existing record that already exists) and inserting (i.e., inserting a new record if a match is not found). In other words, one data set can be used to update existing records at the same time new records are inserted. The method 1200 then proceeds to 1222, where the events file reader 726 reads the events file, serializes the events from the events file and sends the events to the event loader 728.

At 1224, the event loader 728 loads and saves each of the events from the events file to a row of the event table 920 maintained at the data store 130. At 1226, the events uploader manager 722 updates the status of the uploader job record that corresponds to the events file to indicate completed (in the events uploader job detail table 910). At 1228, the events uploader manager 722 deletes the events file from the TFESS 620.

The method 1200 then loops to 1210, where the regular events uploader manager 722 searches the TFESS 620 for another events file that includes the group identifier. To explain further, more than one events file can have the same group identifier so the regular events uploader manager 722 searches the TFESS 620 for more events files having the group identifier. If the regular events uploader manager 722 determines that there is no events file available for a given application server for that group identifier and it is not for current time window, then the regular events uploader manager 722 will move to next possible group identifier based on next minute range window.

Figure 12B:
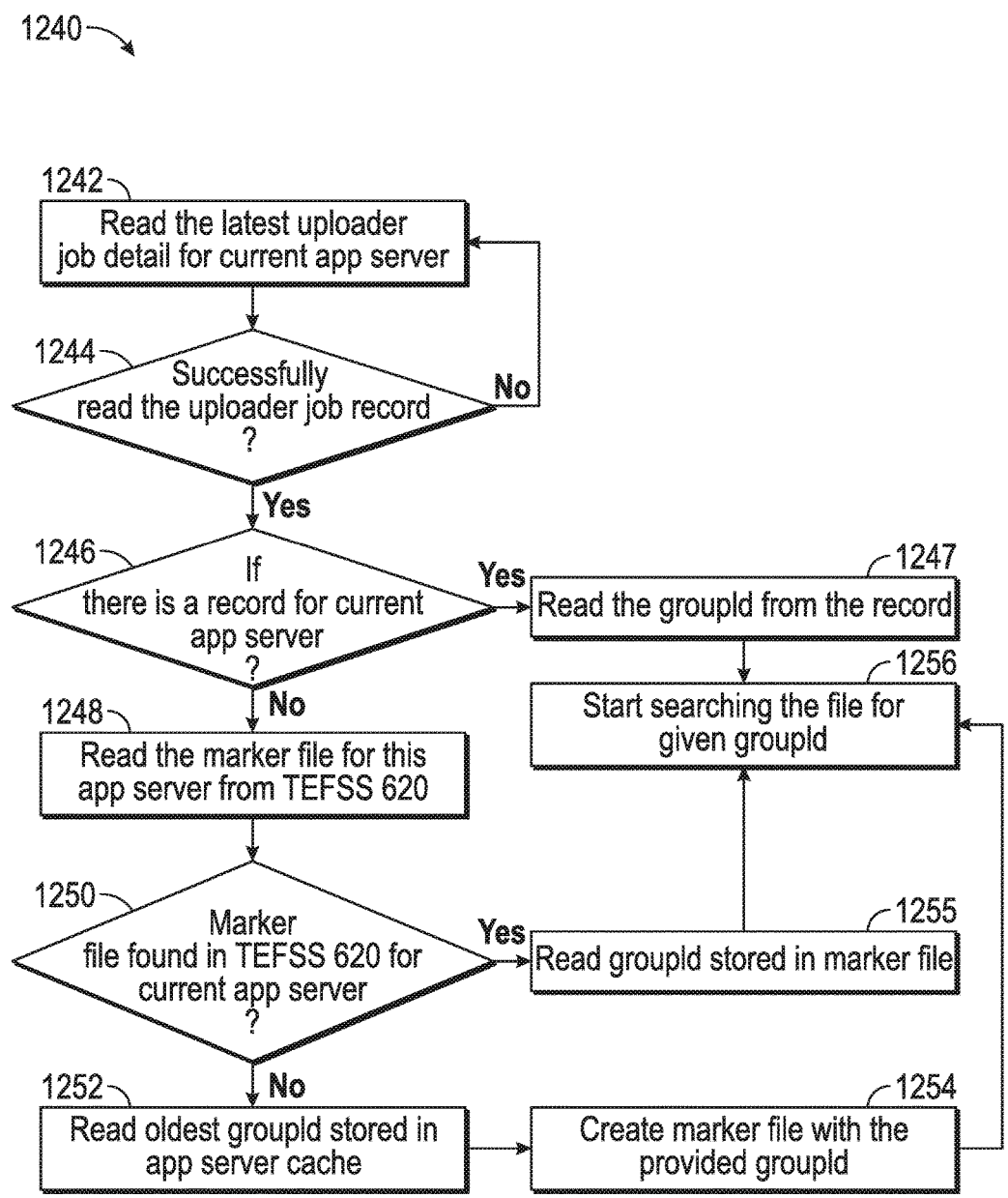
FIG. 12B is a flow diagram illustrating a method performed by the events file uploader service when operating in regular mode according to another embodiment.

FIG. 12B is a flow diagram illustrating a method 1240 performed by the events file uploader service 720 for searching an uploader job record for a starting group identifier when operating in regular mode according to another embodiment. The method 1240 illustrates one exemplary implementation for performing step 1208 of FIG. 12A.

At 1246, the events uploader manager 722 reads the most recent uploader job record for the current application server (from the events uploader job detail table 910), and determines whether the most recent uploader job record for the application server is null (i.e., there is no uploader job record against this application server name in the events uploader job detail table 910).

When the events uploader manager 722 determines (at 1246) that the most recent uploader job record is not null (i.e., that an uploader job record for the current application server was successfully read), then method 1240 proceeds to 1247, where the events uploader manager 722 reads the group identifier from the most recent uploader job record for the application server, and the method 1208 then proceeds to 1210, where the regular events uploader manager 722 searches the TFESS 620 for an events file that includes the starting group identifier.

When the events uploader manager 722 determines (at 1246) that the most recent uploader job record is null, the method 1240 proceeds to 1248, where the events uploader manager 722 attempts to read a marker file for the application server from the TFESS 620, and then determines, at 1250, whether the marker file for the application server was read from the TEFSS 620. In one embodiment, the marker file is a simple text file which records the first group identifier when uploader service starts for the first time on an application server.

When the regular events uploader manager 722 determines that the marker file for the application server was read from the TEFSS 620, the method 1208 proceeds to 1255, where the regular events uploader manager 722 reads a group identifier stored in the marker file. The method 1208 then proceeds to 1210, where the regular events uploader manager 722 searches the TFESS 620 for an events file that includes the starting group.

When the events uploader manager 722 determines that a marker file for the application server was not able to be read from the TEFSS 620, the method 1208 proceeds to 1252, where the regular events uploader manager 722 reads the oldest group identifier stored in a cache at the application server that stores group identifier for that application server.

The method 1208 then proceeds to 1254, where the regular events uploader manager 722 creates a marker file with the group identifier that was retrieved from the cache at the application server. The method 1208 then proceeds to 1210, where the regular events uploader manager 722 searches the TFESS 620 for an events file that includes the starting group identifier.

Figure 12C:
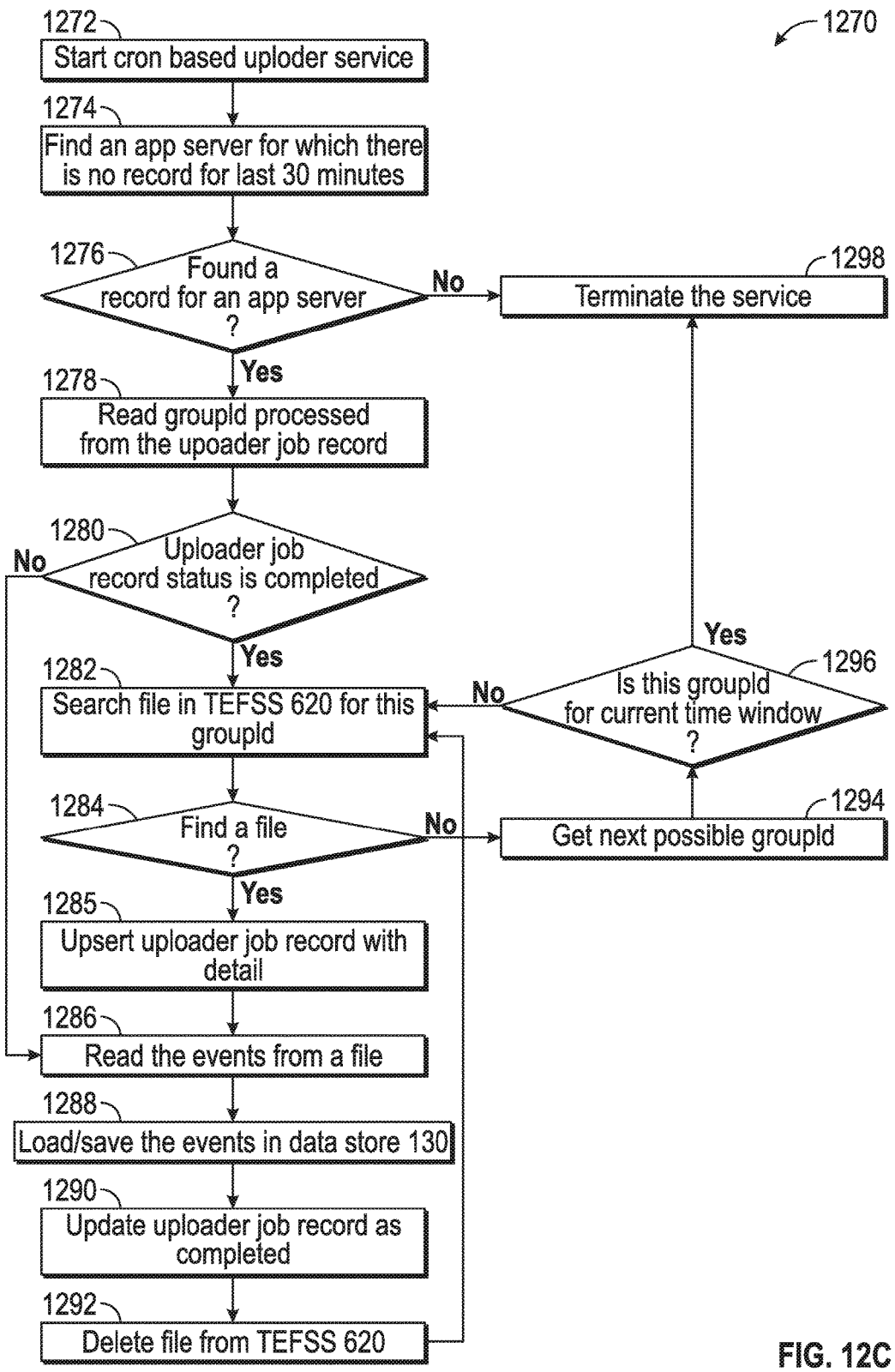
FIG. 12C is a flow diagram illustrating a method performed by the events file uploader service when operating in backup mode according to another embodiment.

FIG. 12C is a flow diagram illustrating a method 1270 performed by the events file uploader service 720 when operating in backup-job mode for transferring events files from the temporary events file storage system (TEFSS) 620 to a data store 130 according to another embodiment. In contrast to FIG. 12A, the backup-job based uploader service is back-up service that is used when one or more of the uploader services 720 (running at another application server) is unable to operate in regular mode that is described above with respect to FIGS. 12A and 12B. In the description of FIG. 12C, two application servers will be referenced that are part of a cluster of application servers. To distinguish between them, one application server that has created an events file and then become unavailable will be referred to as a "first" application server, and another application server that runs a backup events file uploader service 720 will be referred to as a "second" application server. As described above with reference to FIGS. 1-6, when the first application server is unable to directly write events to an event table 920 at the data store 130, the first application server can generate a particular events file 810 and write that particular events file to the TEFSS 620, which can temporarily store the events files for subsequent writing to the data store 130. As will be described in detail below, when the backup events file uploader service 720 that runs at the second application server determines that the first application server is inactive (e.g., has crashed), the backup events file uploader service 720 transfer events files that were created by the first application server from the TEFSS 620 to the data store 130. Among other things, the events uploader manager 722 of the backup events file uploader service 720 can retrieve job detail information from a particular uploader job record, and then, based on the job detail information retrieved, read one or more events files for the first application server from the TEFSS 620. The backup events file uploader service 720 can then write the events from each events file to an event table 920 maintained at the data store 130.

The method 1270 begins at 1272 when the backup job-based uploader service starts.

At 1274, the events uploader manager 722 of the second application server attempts to find an application server in the cluster that has been inactive for a certain duration (e.g., 30 minutes in one implementation). For example, in one embodiment, the events uploader manager 722 of the second application server searches the events uploader job detail table 910 for all inactive application servers (i.e., all application servers that do not have an uploader job record that was started or updated within the certain duration), and randomly selects one of the application servers.

At 1276, the events uploader manager 722 determines whether an inactive application server in the cluster has been found. While this could be any application server in the cluster, for purposes of the following example, it will be assumed that the events uploader manager 722 has determined that the first application server is inactive. However, it is noted that if the events uploader manager 722 of the second application server cannot find an inactive application server, then method 1270 proceeds to 1298 where the backup events file uploader service 720 terminates.

At 1277, the backup events uploader manager 722 reads the most recent uploader job record for the first application server from the events uploader job detail table 910. At 1278, the backup events uploader manager 722 searches the most recent uploader job record for the first application server for a starting group identifier that uniquely identifies a group of events files generated by the first application server during a particular time window. As explained above, each group identifier is associated with a time window of a certain duration (e.g., 10 minutes). If a group identifier has a minute part (mm) that is the same as a current time, then that group identifier is the group identifier for the current time window.

At 1280, backup events uploader manager 722 determines from the most recent uploader job record whether the status of the uploader job record indicates that it is running or completed.

When the status of the most recent uploader job record indicates running this means that the job is in a running state (e.g., the process which is consuming the events file has not reached the completed state), and the method 1200 proceeds from 1280 to 1285 as will be described below.

When the backup events uploader manager 722 determines (at 1280) that the status of the most recent uploader job record indicates that it has been completed this means the events file recorded in this uploader job record is processed successfully and it is time to search for and process next available events file. Therefore, when the status of the most recent uploader job record indicates completed, the method 1200 proceeds to 1282, where the backup events uploader manager 722 of the second application server searches the TFESS 620 for an events file that includes the starting group identifier.

At 1284, the backup events uploader manager 722 determines whether an events file that is associated with the starting group identifier was able to be read from the TEFSS 620.

When the events uploader manager 722 determines (at 1284) that an events file that is associated with the starting group identifier was not able to be read from the TEFSS 620, the method proceeds to 1294, where the backup events uploader manager 722 determines a next possible group identifier that uniquely identifies another group of events files generated by the first application server during another particular time window, and the method 1270 proceeds to 1296. At 1296, the backup events uploader manager 722 determines whether the next possible group identifier is for a current time window (or "corresponds to" the current time window). When the next possible group identifier is determined (at 1296) not to be for the current time window, the method 1200 proceeds to 1282, where the backup events uploader manager 722 searches the TFESS 620 for an events file that includes the next possible group identifier. By contrast, when the next possible group identifier is determined (at 1296) to be for the current time window, the method 1200 proceeds to 1298, where the backup events uploader manager 722 terminates the events file uploader service 720 at the second application server.

When the events uploader manager 722 determines (at 1284) that an events file that includes the starting group identifier was able to be read from the TEFSS 620, the method proceeds to 1285. The backup events uploader manager 722 assigns a worker thread 724 for the particular events file that was read (at 1284). The worker thread 724 includes a particular events file reader 726 and a particular event loader 728. At 1285, where the backup events uploader manager 722 upserts the most recent uploader job record for the first application server at the events uploader job detail table 910 with updated job detail information. The method 1200 then proceeds to 1286, where the events file reader 726 reads the events file, serializes the events from the events file, and sends the events to the event loader 728.

At 1288, the event loader 728 loads and saves each of the events from the events file to a row of the event table 920 maintained at the data store 130. At 1290, the backup events uploader manager 722 updates the status of the uploader job record (in the events uploader job detail table 910) that corresponds to the events file to indicate completed. At 1292, the events uploader manager 722 deletes the events file from the TEFSS 620.

Because more than one events file can have the same group identifier the method 1200 then loops to 1282, where the backup events uploader manager 722 searches the TFESS 620 for another events file that includes the group identifier.

When the status of the most recent uploader job record indicates running this means that the job is in a running state (e.g., the process which is consuming the events file has not reached the completed state), and the method 1200 proceeds from 1280 to 1285. At 1285, the backup events uploader manager 722 upserts the most recent uploader job record for the first application server at the events uploader job detail table 910 with updated job detail information to indicate that the backup events uploader manager 722 has started to process and read the events file. In this case, the file name is already available in uploader job record 1010. The method then proceeds to 1286 as described above.

II. Example System Overview

The following description is of one example of a system in which the features described above may be implemented. The components of the system described below are merely one example and should not be construed as limiting. The features described above with respect to FIGS. 1-12 may be implemented in any other type of computing environment, such as one with multiple servers, one with a single server, a multi-tenant server environment, a single-tenant server environment, or some combination of the above.

Figure 13:
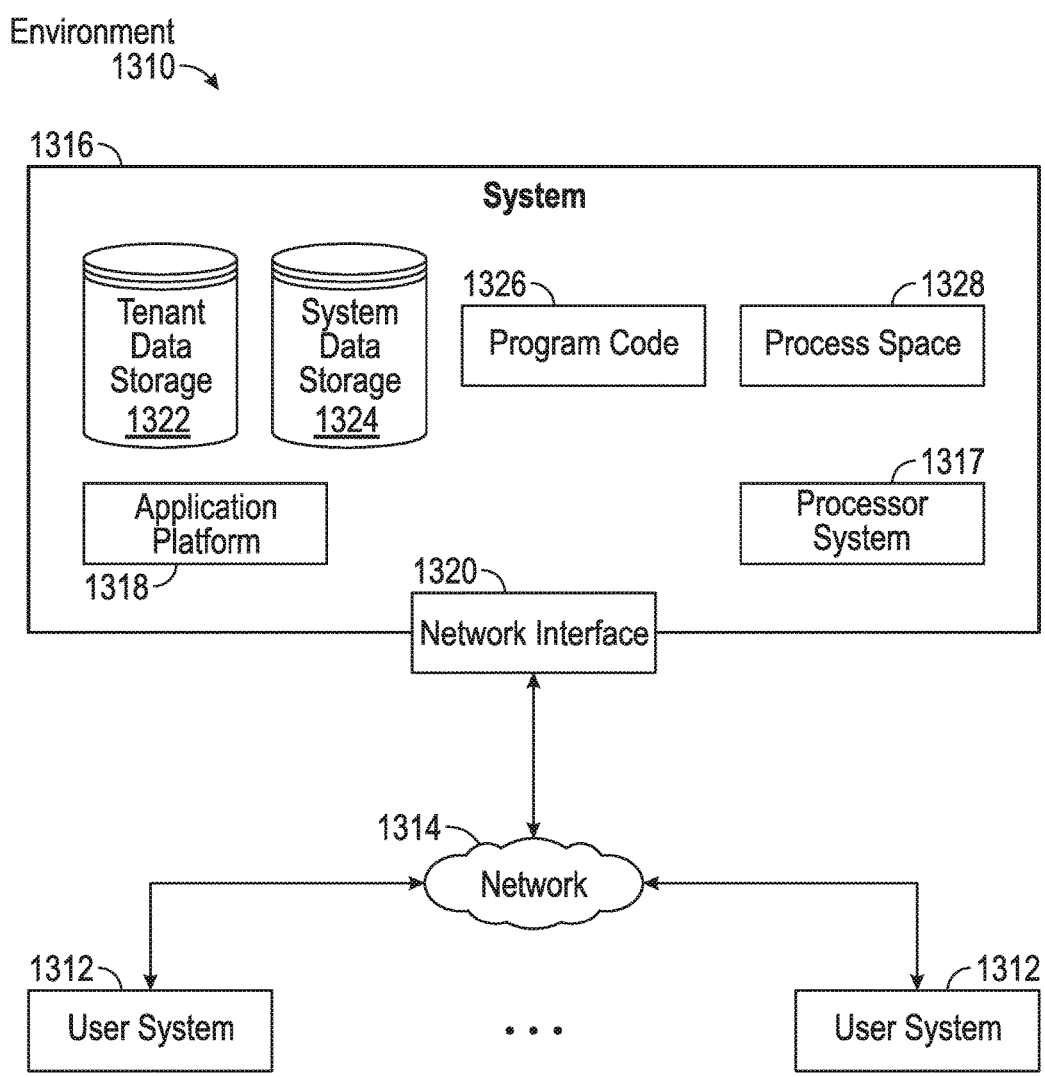
FIG. 13 shows a block diagram of an example environment in which an on-demand database service can be used in accordance with some embodiments.

FIG. 13 shows a block diagram of an example of an environment 1310 in which an on-demand database service can be used in accordance with some implementations. The environment 1310 includes user systems 1312, a network 1314, a database system 1316 (also referred to herein as a "cloud-based system"), a processor system 1317, an application platform 1318, a network interface 1320, tenant database 1322 for storing tenant data 1323, system database 1324 for storing system data 1325, program code 1326 for implementing various functions of the system 1316, and process space 1328 for executing database system processes and tenant-specific processes, such as running applications as part of an application hosting service. In some other implementations, environment 1310 may not have all of these components or systems, or may have other components or systems instead of, or in addition to, those listed above.

In some implementations, the environment 1310 is an environment in which an on-demand database service exists. An on-demand database service, such as that which can be implemented using the system 1316, is a service that is made available to users outside of the enterprise(s) that own, maintain or provide access to the system 1316. As described above, such users generally do not need to be concerned with building or maintaining the system 1316. Instead, resources provided by the system 1316 may be available for such users' use when the users need services provided by the system 1316; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 1318 can be a framework that allows the applications of system 1316 to execute, such as the hardware or software infrastructure of the system 1316. In some implementations, the application platform 1318 enables the creation, management and execution of one or more applications developed by the provider of the on-demand database service, users accessing the on-demand database service via user systems 1312, or third party application developers accessing the on-demand database service via user systems 1312.

In some implementations, the system 1316 implements a web-based customer relationship management (CRM) system. For example, in some such implementations, the system 1316 includes application servers configured to implement and execute CRM software applications as well as provide related data, code, forms, renderable web pages and documents and other information to and from user systems 1312 and to store to, and retrieve from, a database system related data, objects, and Web page content. In some MTS implementations, data for multiple tenants may be stored in the same physical database object in tenant database 1322. In some such implementations, tenant data is arranged in the storage medium(s) of tenant database 1322 so that data of one tenant is kept logically separate from that of other tenants so that one tenant does not have access to another tenant's data, unless such data is expressly shared. The system 1316 also implements applications other than, or in addition to, a CRM application. For example, the system 1316 can provide tenant access to multiple hosted (standard and custom) applications, including a CRM application. User (or third party developer) applications, which may or may not include CRM, may be supported by the application platform 1318. The application platform 1318 manages the creation and storage of the applications into one or more database objects and the execution of the applications in one or more virtual machines in the process space of the system 1316.

According to some implementations, each system 1316 is configured to provide web pages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 1314 can be or include any network or combination of networks of systems or devices that communicate with one another. For example, the network 1314 can be or include any one or any combination of a LAN (local area network), WAN (wide area network), telephone network, wireless network, cellular network, point-to-point network, star network, token ring network, hub network, or other appropriate configuration. The network 1314 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that use are not so limited, although TCP/IP is a frequently implemented protocol.

The user systems 1312 can communicate with system 1316 using TCP/IP and, at a higher network level, other common Internet protocols to communicate, such as HTTP, FTP, AFS, WAP, etc. In an example where HTTP is used, each user system 1312 can include an HTTP client commonly referred to as a "web browser" or simply a "browser" for sending and receiving HTTP signals to and from an HTTP server of the system 1316. Such an HTTP server can be implemented as the sole network interface 1320 between the system 1316 and the network 1314, but other techniques can be used in addition to or instead of these techniques. In some implementations, the network interface 1320 between the system 1316 and the network 1314 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 1312 can be implemented as any computing device(s) or other data processing apparatus or systems usable by users to access the database system 1316. For example, any of user systems 1312 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 1312 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 1316) of the user system 1312 to access, process and view information, pages and applications available to it from the system 1316 over the network 1314.

Each user system 1312 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 1312 in conjunction with pages, forms, applications and other information provided by the system 1316 or other systems or servers. For example, the user interface device can be used to access data and applications hosted by system 1316, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 1312 may differ in their respective capacities, and the capacity of a particular user system 1312 can be entirely determined by permissions (permission levels) for the current user of such user system. For example, where a salesperson is using a particular user system 1312 to interact with the system 1316, that user system can have the capacities allotted to the salesperson. However, while an administrator is using that user system 1312 to interact with the system 1316, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 1312 and some or all of its components are operator-configurable using applications, such as a browser, including computer code executed using a central processing unit (CPU) such as an Intel Pentium® processor or the like. Similarly, the system 1316 (and additional instances of an MTS, where more than one is present) and all of its components can be operator-configurable using application(s) including computer code to run using the processor system 1317, which may be implemented to include a CPU, which may include an Intel Pentium® processor or the like, or multiple CPUs.

The system 1316 includes tangible computer-readable media having non-transitory instructions stored thereon/in that are executable by or used to program a server or other computing system (or collection of such servers or computing systems) to perform some of the implementation of processes described herein. For example, computer program code 1326 can implement instructions for operating and configuring the system 1316 to intercommunicate and to process web pages, applications and other data and media content as described herein. In some implementations, the computer code 1326 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 14:
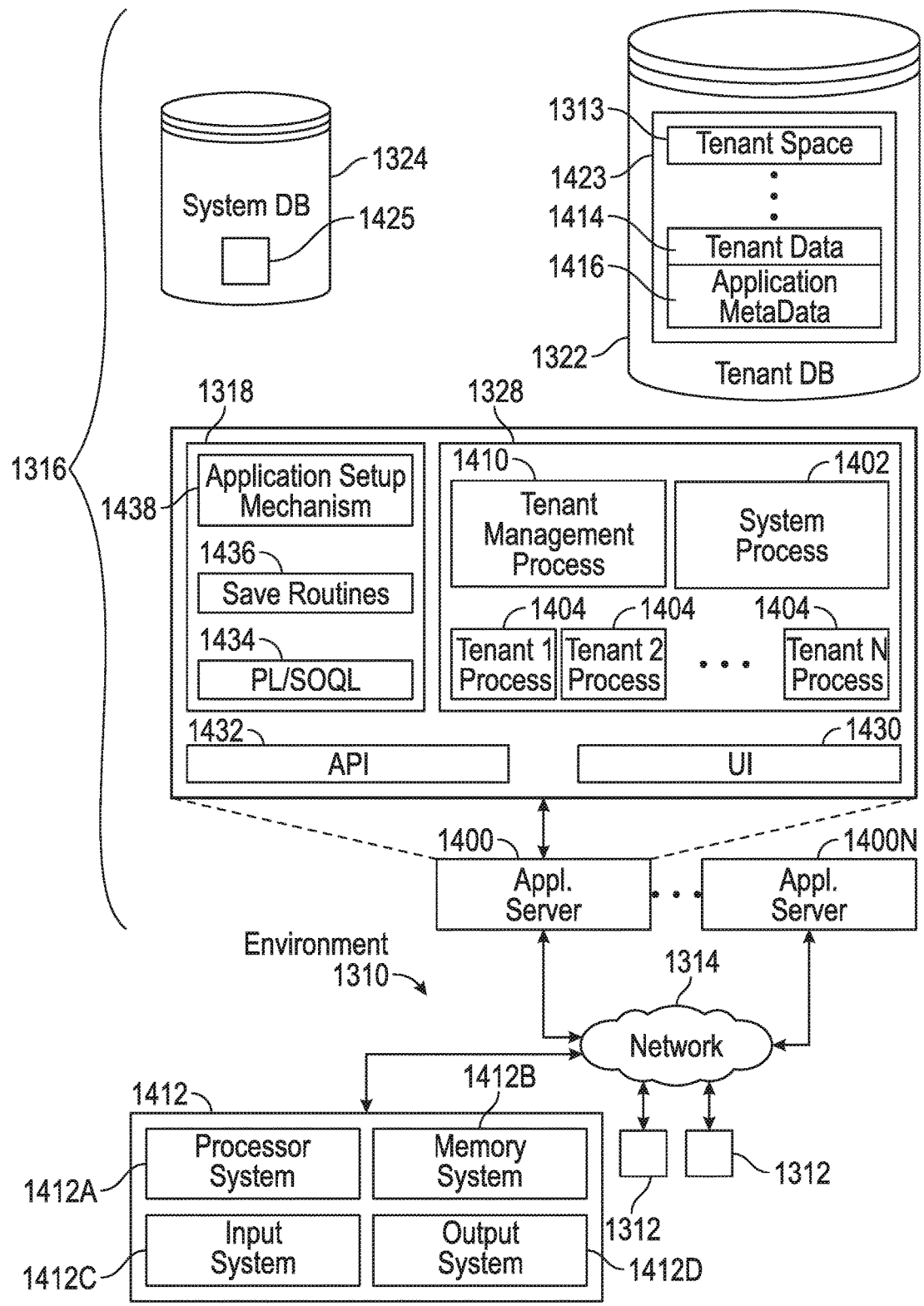
FIG. 14 shows a block diagram of example implementations of elements of FIG. 13 and example interconnections between these elements according to some embodiments.

FIG. 14 shows a block diagram of example implementations of elements of FIG. 13 and example interconnections between these elements according to some implementations. That is, FIG. 14 also illustrates environment 1310, but FIG. 14, various elements of the system 1316 and various interconnections between such elements are shown with more specificity according to some more specific implementations. Elements from FIG. 13 that are also shown in FIG. 14 will use the same reference numbers in FIG. 14 as were used in FIG. 13. Additionally, in FIG. 14, the user system 1312 includes a processor system 1412A, a memory system 1412B, an input system 1412C, and an output system 1412D. The processor system 1412A can include any suitable combination of one or more processors. The memory system 1412B can include any suitable combination of one or more memory devices. The input system 1412C can include any suitable combination of input devices, such as one or more touchscreen interfaces, keyboards, mice, trackballs, scanners, cameras, or interfaces to networks. The output system 1412D can include any suitable combination of output devices, such as one or more display devices, printers, or interfaces to networks.

In FIG. 14, the network interface 1320 of FIG. 13 is implemented as a set of HTTP application servers 14001-1400N. Each application server 1400, also referred to herein as an "app server," is configured to communicate with tenant database 1322 and the tenant data 1423 therein, as well as system database 1324 and the system data 1425 therein, to serve requests received from the user systems 1412. The tenant data 1423 can be divided into individual tenant storage spaces 1413, which can be physically or logically arranged or divided. Within each tenant storage space 1413, tenant data 1414 and application metadata 1416 can similarly be allocated for each user. For example, a copy of a user's most recently used (MRU) items can be stored to user storage 1414. Similarly, a copy of MRU items for an entire organization that is a tenant can be stored to tenant storage space 1413.

The process space 1328 includes system process space 1402, individual tenant process spaces 1404 and a tenant management process space 1410. The application platform 1318 includes an application setup mechanism 1438 that supports application developers' creation and management of applications. Such applications and others can be saved as metadata into tenant database 1322 by save routines 1436 for execution by subscribers as one or more tenant process spaces 1404 managed by tenant management process 1410, for example. Invocations to such applications can be coded using PL/SOQL 1434, which provides a programming language style interface extension to API 1432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 1316 of FIG. 14 also includes a user interface (UI) 1430 and an application programming interface (API) 1432 to system 1316 resident processes to users or developers at user systems 1412. In some other implementations, the environment 1310 may not have the same elements as those listed above or may have other elements instead of, or in addition to, those listed above.

Each application server 1400 can be communicably coupled with tenant database 1322 and system database 1324, for example, having access to tenant data 1423 and system data 1425, respectively, via a different network connection. For example, one application server 14001 can be coupled via the network 1314 (for example, the Internet), another application server 1400N can be coupled via a direct network link, and another application server (not illustrated) can be coupled by yet a different network connection. Transfer Control Protocol and Internet Protocol (TCP/IP) are examples of typical protocols that can be used for communicating between application servers 1400 and the system 1316. However, it will be apparent to one skilled in the art that other transport protocols can be used to optimize the system 1316 depending on the network interconnections used.

In some implementations, each application server 1400 is configured to handle requests for any user associated with any organization that is a tenant of the system 1316. Because it can be desirable to be able to add and remove application servers 1400 from the server pool at any time and for various reasons, in some implementations there is no server affinity for a user or organization to a specific application server

1400. In some such implementations, an interface system implementing a load balancing function (for example, an F5 Big-IP load balancer) is communicably coupled between the application servers 1400 and the user systems 1412 to distribute requests to the application servers 1400. In one implementation, the load balancer uses a least-connections algorithm to route user requests to the application servers 1400. Other examples of load balancing algorithms, such as round robin and observed-response-time, also can be used. For example, in some instances, three consecutive requests from the same user could hit three different application servers 1400, and three requests from different users could hit the same application server 1400. In this manner, by way of example, system 1316 can be a multi-tenant system in which system 1316 handles storage of, and access to, different objects, data and applications across disparate users and organizations.

In one example storage use case, one tenant can be a company that employs a sales force where each salesperson uses system 1316 to manage aspects of their sales. A user can maintain contact data, leads data, customer follow-up data, performance data, goals and progress data, etc., all applicable to that user's personal sales process (for example, in tenant database 1322). In an example of a MTS arrangement, because all of the data and the applications to access, view, modify, report, transmit, calculate, etc., can be maintained and accessed by a user system 1412 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 1316 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 1316 also can maintain system level data usable by multiple tenants or other data. Such system level data can include industry reports, news, postings, and the like that are sharable among tenants.

In some implementations, the user systems 1412 (which also can be client systems) communicate with the application servers 1400 to request and update system-level and tenant-level data from the system 1316. Such requests and updates can involve sending one or more queries to tenant database 1322 or system database 1324. The system 1316 (for example, an application server 1400 in the system 1316) can automatically generate one or more SQL statements (for example, one or more SQL queries) designed to access the desired information. System database 1324 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 15A:
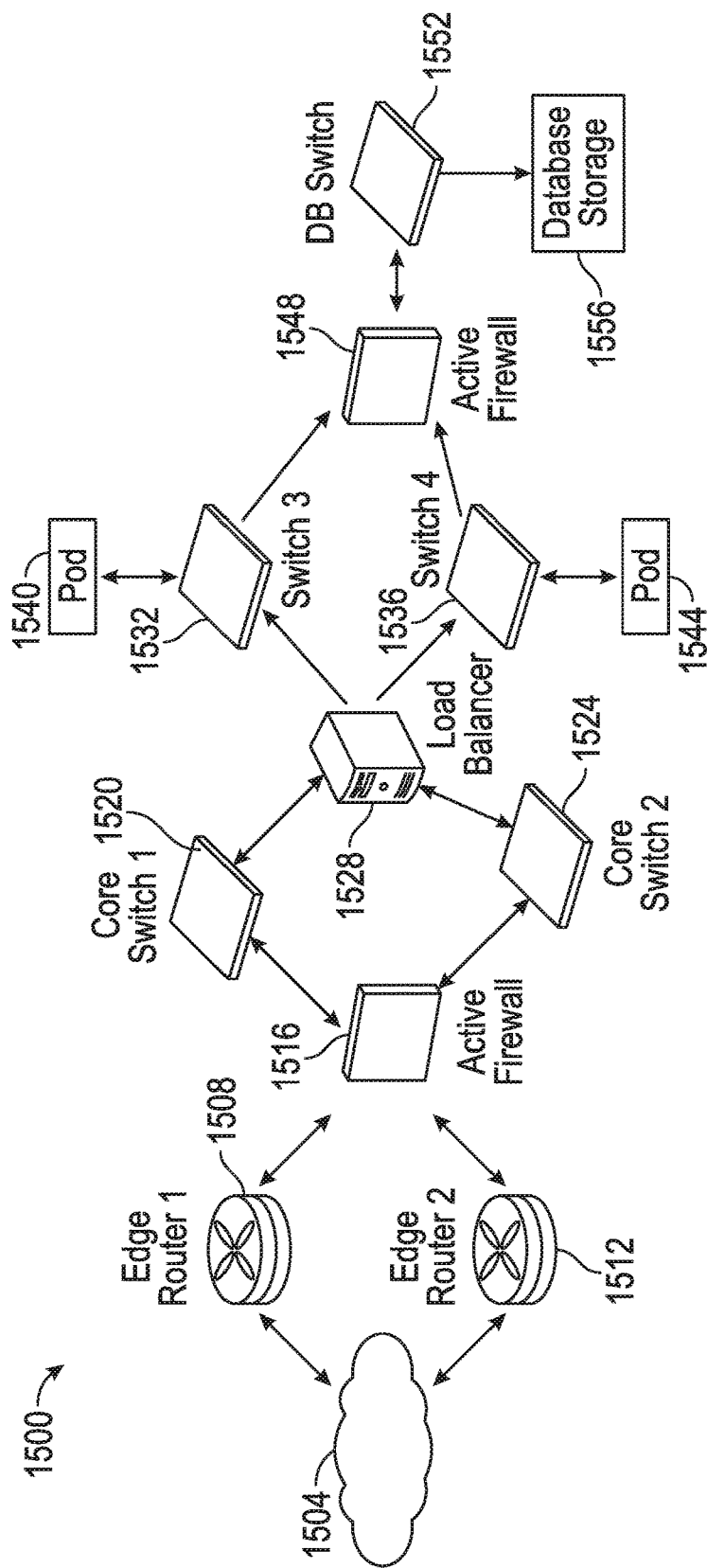
FIG. 15A shows a system diagram of example architectural components of an on-demand database service environment according to some embodiments.

FIG. 15A shows a system diagram illustrating example architectural components of an on-demand database service environment 1500 according to some implementations. A client machine communicably connected with the cloud 1504, generally referring to one or more networks in combination, as described herein, can communicate with the on-demand database service environment 1500 via one or more edge routers 1508 and 1512. A client machine can be any of the examples of user systems 12 described above. The edge routers can communicate with one or more core switches 1520 and 1524 through a firewall 1516. The core switches can communicate with a load balancer 1528, which can distribute server load over different pods, such as the pods 1540 and 1544. The pods 1540 and 1544, which can each include one or more servers or other computing resources, can perform data processing and other operations used to provide on-demand services. Communication with the pods can be conducted via pod switches 1532 and 1536. Components of the on-demand database service environment can communicate with database storage 1556 through a database firewall 1548 and a database switch 1552.

Figure 15B:
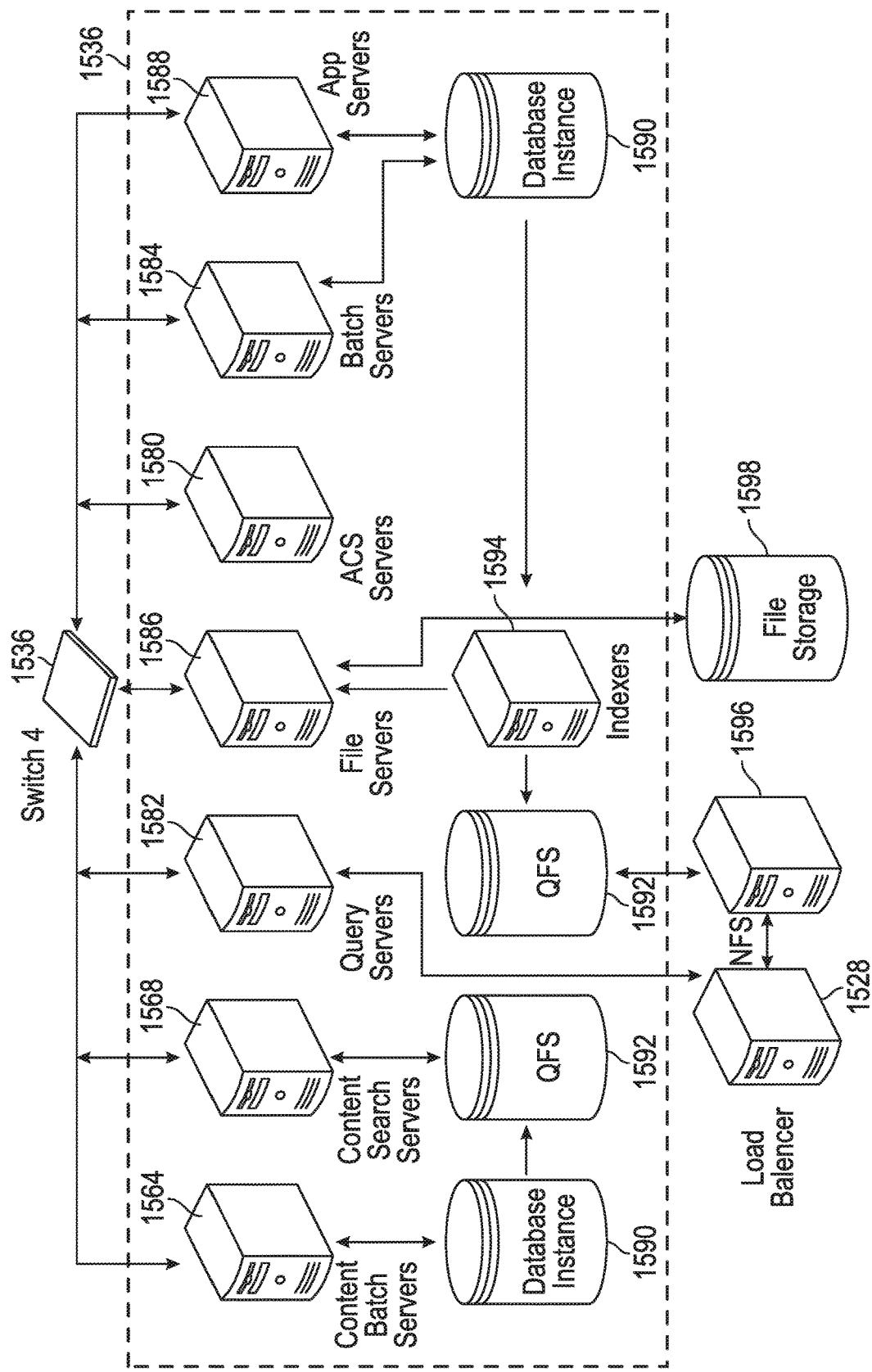
FIG. 15B shows a system diagram further illustrating example architectural components of an on-demand database service environment according to some embodiments.

As shown in FIGS. 15A and 15B, accessing an on-demand database service environment can involve communications transmitted among a variety of different hardware or software components. Further, the on-demand database service environment 1500 is a simplified representation of an actual on-demand database service environment. For example, while only one or two devices of each type are shown in FIGS. 15A and 15B, some implementations of an on-demand database service environment can include anywhere from one to several devices of each type. Also, the on-demand database service environment need not include each device shown in FIGS. 15A and 15B, or can include additional devices not shown in FIGS. 15A and 15B.

Additionally, it should be appreciated that one or more of the devices in the on-demand database service environment 1500 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1504 is intended to refer to a data network or multiple data networks, often including the Internet. Client machines communicably connected with the cloud 1504 can communicate with other components of the on-demand database service environment 1500 to access services provided by the on-demand database service environment. For example, client machines can access the on-demand database service environment to retrieve, store, edit, or process information. In some implementations, the edge routers 1508 and 1512 route packets between the cloud 1504 and other components of the on-demand database service environment 1500. For example, the edge routers 1508 and 1512 can employ the Border Gateway Protocol (BGP). The BGP is the core routing protocol of the Internet. The edge routers 1508 and 1512 can maintain a table of IP networks or 'prefixes', which designate network reachability among autonomous systems on the Internet.

In some implementations, the firewall 1516 can protect the inner components of the on-demand database service environment 1500 from Internet traffic. The firewall 1516 can block, permit, or deny access to the inner components of the on-demand database service environment 1500 based upon a set of rules and other criteria. The firewall 1516 can act as one or more of a packet filter, an application gateway, a stateful filter, a proxy server, or any other type of firewall.

In some implementations, the core switches 1520 and 1524 are high-capacity switches that transfer packets within the on-demand database service environment 1500. The core switches 1520 and 1524 can be configured as network bridges that quickly route data between different components within the on-demand database service environment. In some implementations, the use of two or more core switches 1520 and 1524 can provide redundancy or reduced latency.

In some implementations, the pods 1540 and 1544 perform the core data processing and service functions provided by the on-demand database service environment. Each pod can include various types of hardware or software computing resources. An example of the pod architecture is discussed in greater detail with reference to FIG. 15B. In some implementations, communication between the pods 1540 and 1544 is conducted via the pod switches 1532 and 1536. The pod switches 1532 and 1536 can facilitate communication between the pods 1540 and 1544 and client machines communicably connected with the cloud 1504, for example via core switches 1520 and 1524. Also, the pod switches 1532 and 1536 may facilitate communication between the pods 1540 and 1544 and the database storage 1556. In some implementations, the load balancer 1528 can distribute workload between the pods 1540 and 1544. Balancing the on-demand service requests between the pods can assist in improving the use of resources, increasing throughput, reducing response times, or reducing overhead. The load balancer 1528 may include multilayer switches to analyze and forward traffic.

In some implementations, access to the database storage 1556 is guarded by a database firewall 1548. The database firewall 1548 can act as a computer application firewall operating at the database application layer of a protocol stack. The database firewall 1548 can protect the database storage 1556 from application attacks such as structure query language (SQL) injection, database rootkits, and unauthorized information disclosure. In some implementations, the database firewall 1548 includes a host using one or more forms of reverse proxy services to proxy traffic before passing it to a gateway router. The database firewall 1548 can inspect the contents of database traffic and block certain content or database requests. The database firewall 1548 can work on the SQL application level atop the TCP/IP stack, managing applications' connection to the database or SQL management interfaces as well as intercepting and enforcing packets traveling to or from a database network or application interface.

In some implementations, communication with the database storage 1556 is conducted via the database switch 1552. The multi-tenant database storage 1556 can include more than one hardware or software components for handling database queries. Accordingly, the database switch 1552 can direct database queries transmitted by other components of the on-demand database service environment (for example, the pods 1540 and 1544) to the correct components within the database storage 1556. In some implementations, the database storage 1556 is an on-demand database system shared by many different organizations as described above with reference to FIG. 13 and FIG. 14.

15FIG. 15B shows a system diagram further illustrating example architectural components of an on-demand database service environment according to some implementations. The pod 1544 can be used to render services to a user of the on-demand database service environment 1500. In some implementations, each pod includes a variety of servers or other systems. The pod 1544 includes one or more content batch servers 1564, content search servers 1568, query servers 1582, file force servers 1586, access control system (ACS) servers 1580, batch servers 1584, and app servers 1588. The pod 1544 also can include database instances 1590, quick file systems (QFS) 1592, and indexers 1594. In some implementations, some or all communication between the servers in the pod 1544 can be transmitted via the switch 1536.

In some implementations, the app servers 1588 include a hardware or software framework dedicated to the execution of procedures (for example, programs, routines, scripts) for supporting the construction of applications provided by the on-demand database service environment 1500 via the pod 1544. In some implementations, the hardware or software framework of an app server 1588 is configured to execute operations of the services described herein, including performance of the blocks of various methods or processes described herein. In some alternative implementations, two or more app servers 1588 can be included and cooperate to perform such methods, or one or more other servers described herein can be configured to perform the disclosed methods.

The content batch servers 1564 can handle requests internal to the pod. Some such requests can be long-running or not tied to a particular customer. For example, the content batch servers 1564 can handle requests related to log mining, cleanup work, and maintenance tasks. The content search servers 1568 can provide query and indexer functions. For example, the functions provided by the content search servers 1568 can allow users to search through content stored in the on-demand database service environment. The file force servers 1586 can manage requests for information stored in the File force storage 1598. The File force storage 1598 can store information such as documents, images, and basic large objects (BLOBs). By managing requests for information using the file force servers 1586, the image footprint on the database can be reduced. The query servers 1582 can be used to retrieve information from one or more file storage systems. For example, the query system 1582 can receive requests for information from the app servers 1588 and transmit information queries to the NFS 1596 located outside the pod.

The pod 1544 can share a database instance 1590 configured as a multi-tenant environment in which different organizations share access to the same database. Additionally, services rendered by the pod 1544 may call upon various hardware or software resources. In some implementations, the ACS servers 1580 control access to data, hardware resources, or software resources. In some implementations, the batch servers 1584 process batch jobs, which are used to run tasks at specified times. For example, the batch servers 1584 can transmit instructions to other servers, such as the app servers 1588, to trigger the batch jobs.

In some implementations, the QFS 1592 is an open source file storage system available from Sun Microsystems® of Santa Clara, Calif. The QFS can serve as a rapid-access file storage system for storing and accessing information available within the pod 1544. The QFS 1592 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1568 or indexers 1594 to identify, retrieve, move, or update data stored in the network file storage systems 1596 or other storage systems.

In some implementations, one or more query servers 1582 communicate with the NFS 1596 to retrieve or update information stored outside of the pod 1544. The NFS 1596 can allow servers located in the pod 1544 to access information to access files over a network in a manner similar to how local storage is accessed. In some implementations, queries from the query servers 1582 are transmitted to the NFS 1596 via the load balancer 1528, which can distribute resource requests over various resources available in the on-demand database service environment. The NFS 1596 also can communicate with the QFS 1592 to update the information stored on the NFS 1596 or to provide information to the QFS 1592 for use by servers located within the pod 1544.

In some implementations, the pod includes one or more database instances 1590. The database instance 1590 can transmit information to the QFS 1592. When information is transmitted to the QFS, it can be available for use by servers within the pod 1544 without using an additional database call. In some implementations, database information is transmitted to the indexer 1594. Indexer 1594 can provide an index of information available in the database 1590 or QFS 1592. The index information can be provided to file force servers 1586 or the QFS 1592.

Figure 16:
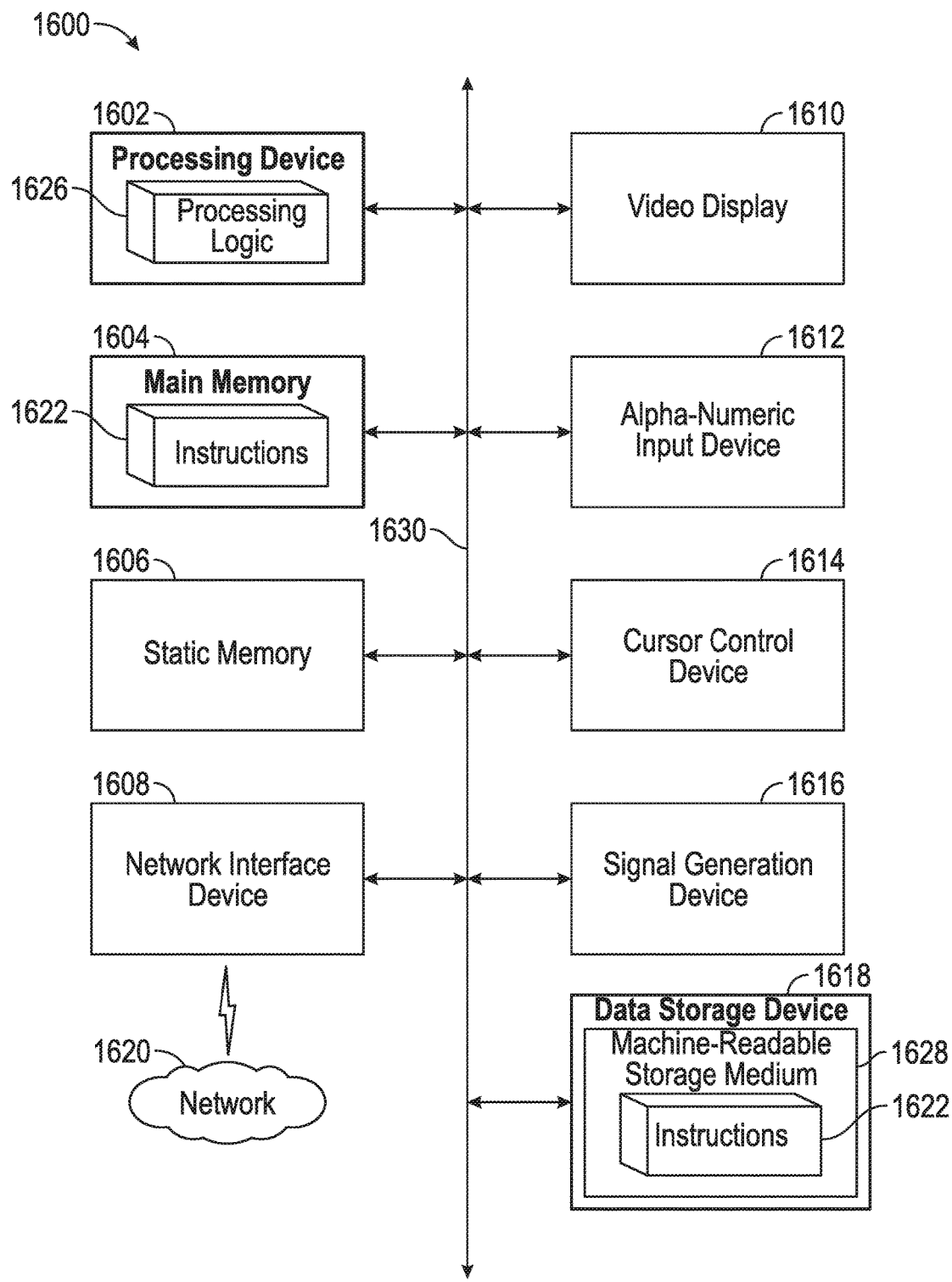
FIG. 16 is a block diagram illustrating an exemplary computer system, according to an embodiment.

FIG. 16 illustrates a diagrammatic representation of a machine in the exemplary form of a computer system 1600 within which a set of instructions, for causing the machine to perform any one or more of the methodologies discussed herein, may be executed. The system 1600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1600 may represent application server 110, as shown in FIGS. 2-4 and 6.

The exemplary computer system 1600 includes a processing device (processor) 1602, a main memory 1604 (e.g., read-only memory (ROM), flash memory, dynamic random access memory (DRAM) such as synchronous DRAM (SDRAM)), a static memory 1606 (e.g., flash memory, static random access memory (SRAM)), and a data storage device 1618, which communicate with each other via a bus 1630.

Processing device 1602 represents one or more general-purpose processing devices such as a microprocessor, central processing unit, or the like. More particularly, the processing device 1602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1602 may also be one or more special-purpose processing devices such as an application specific integrated circuit (ASIC), a field programmable gate array (FPGA), a digital signal processor (DSP), network processor, or the like.

The computer system 1600 may further include a network interface device 1608. The computer system 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1616 (e.g., a speaker).

The data storage device 1618 may include a computer-readable medium 1628 on which is stored one or more sets of instructions 1622 (e.g., instructions of in-memory buffer service 114) embodying any one or more of the methodologies or functions described herein. The instructions 1622 may also reside, completely or at least partially, within the main memory 1604 and/or within processing logic 1626 of the processing device 1602 during execution thereof by the computer system 1600, the main memory 1604 and the processing device 1602 also constituting computer-readable media. The instructions may further be transmitted or received over a network 1620 via the network interface device 1608.

While the computer-readable storage medium 1628 is shown in an exemplary embodiment to be a single medium, the term "computer-readable storage medium" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed:

1. A system, comprising:
   an application server configured to run a client application that generates events;
   a data store that is configured to store events, wherein the data store comprises: an events uploader job detail table that comprises a plurality of rows, wherein each row is configured to store an uploader job record; and
   a temporary events file storage system (TEFSS);
   wherein the application server comprises:
      an indirect events writer that is invoked when events are unable to be directly written to the data store, comprising: a plurality of event capture threads each being configured to:
         generate a particular events file that includes a plurality of events flushed from an in-memory buffer service, and
         write that particular events file to the TEFSS; and
      an events file uploader service, comprising:
         an events uploader manager is configured to: create an uploader job record for a particular one of the events files stored at the TEFSS, wherein the uploader job record includes job detail information that points to that particular one of the events files; and write that uploader job record to the events uploader job detail table, and
      wherein the events file uploader service is configured to read that particular one of the events files from the TEFSS, and then write the events from that particular one of the events files to the data store.

2. The system according to claim 1, and wherein the application server further comprises:
   a capture service configured to: receive events generated by the client application running on the application server and to provide the events to the in-memory buffer service,
   wherein the in-memory buffer service is configured to temporarily hold the events in a bounded buffer that is implemented in physical memory at the application server, wherein the bounded buffer comprises a plurality of single-threaded buffer segments that are each configured to temporarily hold some of the events received from the capture service until a flush operation is performed, wherein each particular single-threaded buffer segment holds a plurality of events;

a consumer executor service configured to: instantiate a plurality of consumer threads that each correspond to a particular single-threaded buffer segment, wherein each consumer thread comprises:

an instance of an events reader that is configured to read events flushed from a corresponding single-threaded buffer segment and to add an identifier to each the events; and an instance of a direct events writer that is configured to attempt to directly write each event to the data store.

3. The system according to claim 2, wherein each consumer thread provides the events to a corresponding one of the event capture threads, and wherein each of the event capture threads comprises:

an instance of an events file writer; and an instance of an invoker that is configured to:

determine whether a corresponding instance of the direct events writer was able to successfully directly write each event, that was read from a corresponding single-threaded buffer segment, to an event table at the data store; and invoke the instance of an events file writer at that event capture thread, whenever the invoker determines that the corresponding instance of the direct events writer was unable to successfully write each event directly to the data store, to serialize the plurality of events from the particular single-threaded buffer segment to generate an events file and to write the events file to the TEFSS.

4. The system according to claim 1, wherein each events file comprises:

a file name;

a group identifier that uniquely identifies a group of events files that were generated during a particular time window; and file information comprising a file type, and a plurality of events that are serialized.

5. The system according to claim 4, wherein the file name comprises: an application server name of the application server that generated the events in the events file; a creation date for each of the events in the events file; and a thread identifier that specifies a name of a thread writing the events file.

6. The system according to claim 1, wherein each uploader job record comprises:

a cluster identifier that uniquely identifies a collection of instances that a grouped as a cluster;

an instance identifier that uniquely identifies a collection of application servers grouped as an instance;

an application server name of a particular application server;

a group identifier that uniquely identifies a group of events files that were generated during a particular time window;

a job started date that specifies when the particular events file was created; and a job type that indicates either regular or backup.

7. The system according to claim 6, wherein each uploader job record further comprises: a file name of the particular events file, and wherein each row of the events uploader job detail table includes a row key that is used by an events uploader manager to look up job detail information for a particular event file, wherein the row key is defined by the combination of the instance identifier, the application server name, the group identifier, the file name, and the job started date.

8. The system according to claim 6, wherein the cluster identifier, the instance identifier, the application server name, and the job type are used to identify a particular instance of the events file uploader service that runs on a particular application server of the cluster.

9. The system according to claim 6, wherein each uploader job record further comprises:

a number of events that specifies a number of events for this particular events file;

a last updated time that indicates when the particular events file was last updated;

a number of retry attempts that specifies how many times the events file uploader service has attempted to process the particular events file; and a status that indicates either running or completed.

10. The system according to claim 1, wherein the events uploader manager is configured to:

maintain each of the uploader job records that are stored in the events uploader job detail table; and retrieve job detail information from particular uploader job records stored at the events uploader job detail table of the data store.

11. The system according to claim 10, wherein the events uploader manager is further configured to:

read, from the events uploader job detail table, the most recent uploader job record for the application server;

searching the most recent uploader job record for the application server for a starting group identifier that uniquely identifies a group of events files generated by the application server during a particular time window; and determine from the most recent uploader job record whether a status for the most recent uploader job record indicates running or completed.

12. The system according to claim 11, wherein the events uploader manager is further configured to:

when the status of the most recent uploader job record indicates completed: search the TFESS for an events file that includes the starting group identifier; and determine whether an events file that is associated with the starting group identifier was able to be read from the TEFSS.

13. The system according to claim 12, when the events file that is associated with the starting group identifier was not able to be read from the TEFSS, wherein the events uploader manager is further configured to:

determine a next possible group identifier that uniquely identifies another group of events files generated by the application server during another particular time window;

determine whether the next possible group identifier is for a current time window;

when the next possible group identifier is not for the current time window, search the TFESS for an events file that includes the next possible group identifier without delay, or when the next possible group identifier is for the current time window, wait for a time period before searching the TFESS for an events file that includes the next possible group identifier.

14. The system according to claim 12, when the events file that includes the starting group identifier was able to be read from the TEFSS, wherein the events uploader manager is further configured to:

instantiate a worker thread and assign the worker thread to the particular events file that was read, wherein the worker thread comprises: a particular events file reader and a particular event loader; and wherein the events uploader manager is configured to:
upsert the most recent uploader job record for the application server with updated job detail information at the events uploader job detail table of the data store;

wherein the events file reader is configured to:
read at least one events file for the application server from the TEFSS based on the job detail information retrieved from the events uploader job detail table, serialize the events from the events file and send the events to the event loader.

15. The system according to claim 14, wherein the events loader is configured to:
load and save each of the events from the events file to a row of an event table maintained at the data store;
wherein the events uploader manager is further configured to:
update, in the events uploader job detail table, the status of the uploader job record that corresponds to the events file to indicate completed;
delete the events file from the TEFSS; and
search the TFESS for another events file that includes the starting group identifier.

16. The system according to claim 11, when it is determined from the most recent uploader job record that status for the most recent uploader job record indicates running, wherein the events uploader manager is further configured to:
assign a worker thread for the particular events file that was read, wherein the worker thread comprises: a particular events file reader and a particular event loader; and
wherein the events uploader manager is configured to:
upsert the most recent uploader job record for the application server with updated job detail information at the events uploader job detail table of the data store;
wherein the events file reader is configured to:
read the events file, serialize the events from the events file and send the events to the event loader.

17. The system according to claim 16, wherein the events loader is configured to:
load and save each of the events from the events file to a row of the event table maintained at the data store;
wherein the events uploader manager is further configured to:
update, in the events uploader job detail table, the status of the uploader job record that corresponds to the events file to indicate completed; and
delete the events file from the TEFSS, and
search the TFESS for another events file that includes the starting group identifier.

18. The system according to claim 11, when searching the most recent uploader job record for the application server for a starting group identifier, wherein the events uploader manager is further configured to:
determine whether the most recent uploader job record from the events uploader job detail table for the application server is null;
read the group identifier from the most recent uploader job record if the most recent uploader job record is not determined to be null; and
search the TFESS for an events file that includes the starting group identifier.

19. The system according to claim 18, wherein the events uploader manager is further configured to:
attempt to read a marker file for the application server from the TEFSS if the most recent uploader job record is determined to be null;
determine whether the marker file for the application server was read from the TEFSS;
read a group identifier stored in the marker file when the marker file for the application server was read from the TEFSS; and
search the TFESS for an events file that includes the group identifier stored in the marker file.

20. The system according to claim 19, wherein the events uploader manager is further configured to:
read a group identifier stored in a cache at the application server when the marker file for the application server was not read from the TEFSS;
create a marker file with the group identifier stored in the cache at the application server; and
search the TFESS for an events file that includes the group identifier stored in the marker file.

21. The system according to claim 1, wherein the data store is a non-relational, distributed database.

22. A non-transitory computer-readable medium including instructions, which when executed by a processor at an application server, are configurable to perform a method comprising:
at an event capture thread of an indirect events writer:
generating a particular events file that comprises a plurality of events received from an in-memory buffer service when those events are unable to be directly written to a data store, wherein the data store comprises: an events uploader job detail table that comprises a plurality of rows, wherein each row is configured to store an uploader job record;
writing that particular events file to a temporary events file storage system (TEFSS) that is configured to temporarily store that particular events file for subsequent writing to the data store;
at an events uploader manager of an events file uploader service:
creating an uploader job record for that particular events file that includes job detail information that points to that particular events file; and
writing the uploader job record to the events uploader job detail table; and
at the events file uploader service:
reading that particular events file from the TEFSS; and
writing the plurality of events from that particular events file that was read to the data store.

23. The non-transitory computer-readable medium of claim 22, further comprising:
receiving, at a capture service, events from a client application running on the application server, wherein the events are to be stored in a data store;
storing, via the capture service, the events in an in-memory buffer service comprising: a bounded buffer that is implemented in physical memory at the application server, wherein the bounded buffer comprises a plurality of single-threaded buffer segments that are each configured to temporarily store some of the events until a flush operation is performed;

flushing the plurality of single-threaded buffer segments of the bounded buffer, wherein each particular single-threaded buffer segment includes the plurality of events;

instantiating, via a consumer executor service, a plurality of consumer threads that each corresponds to a particular single-threaded buffer segment, wherein each consumer thread comprises: an instance of an events reader and an instance of a direct events writer;

reading, at the events reader of each consumer thread, the events flushed from the particular single-threaded buffer segment that corresponds to that consumer thread;

adding, at each direct events writer, an identifier to each the events; and at each direct events writer, attempting to directly write each event to the data store.

24. The non-transitory computer-readable medium of claim 23, wherein the indirect events writer comprises a plurality of the event capture threads, and wherein each of the event capture threads further comprises: an instance of an invoker, wherein the method further comprises:

at each invoker, determining whether a corresponding instance of the direct events writer was able to successfully write the events, that were read from the particular single-threaded buffer segment, directly to an event table at the data store; and whenever an instance of an invoker at one of the event capture thread determines that a corresponding instance of the direct events writer was unable to successfully write the events directly to the data store, invoking an instance of the events file writer at that event capture thread, and receiving the plurality of events from that corresponding instance of the direct events writer for that events file writer; and serializing, at each instance of the events file writer, the plurality of events from the particular single-threaded buffer segment into an events file.

25. The non-transitory computer-readable medium of claim 24, wherein each events file comprises: a file name; a group identifier that uniquely identifies a group of events files that were generated during a particular time window; and a plurality of events that are serialized.

26. The non-transitory computer-readable medium of claim 22, wherein the events uploader manager is configured to maintain uploader job records stored in the events uploader job detail table of the data store, wherein each uploader job record comprises: a group identifier that uniquely identifies a group of events files that were generated during a particular time window.

27. The non-transitory computer-readable medium of claim 26, wherein the step of reading that particular events file from the TEFSS, comprises:

reading at the events uploader manager, from the events uploader job detail table, a most recent uploader job record for the application server;

searching, at the events uploader manager, the most recent uploader job record for the application server for a starting group identifier that uniquely identifies a group of events files generated by the application server during a particular time window;

determining, at the events uploader manager, from the most recent uploader job record whether a status for the most recent uploader job record indicates running or completed;

when the status of the most recent uploader job record indicates completed: searching, at the events uploader manager, the TFESS for an events file that includes the starting group identifier; and determining, at the events uploader manager, whether an events file that is associated with the starting group identifier was able to be read from the TEFSS;

when the events file that is associated with the starting group identifier was not able to be read from the TEFSS: determining, at the events uploader manager, a next possible group identifier that uniquely identifies another group of events files generated by the application server during another particular time window; and determining, at the events uploader manager, whether the next possible group identifier is for a current time window;

when the next possible group identifier is for the current time window, waiting for a time period; and searching, at the events uploader manager, the TFESS for an events file that includes the next possible group identifier; and when the next possible group identifier is not for the current time window, searching, at the events uploader manager, the TFESS for an events file that includes the next possible group identifier;

when the events file that includes the starting group identifier was able to be read from the TEFSS: assigning, at the events uploader manager, a worker thread for the particular events file that was read, wherein the worker thread comprises: a particular events file reader and a particular event loader; upserting from the events uploader manager, at the events uploader job detail table of the data store, the most recent uploader job record for the application server with updated job detail information; and at the events file reader: reading at least one events file for the application server from the TEFSS based on the job detail information retrieved, serializing the events from the events file, and sending the events to the event loader;

wherein the step of writing the plurality of events from each events file that was read to the data store, comprises: loading and saving, via the events loader, each of the events from each events file to a row of an event table maintained at the data store;

further comprising:

updating at the events uploader manager, in the events uploader job detail table, the status of the uploader job record that corresponds to the events file to indicate completed;

deleting, at the events uploader manager, the events file from the TEFSS; and searching, at the events uploader manager, the TFESS for another events file that includes the starting group identifier.

28. The non-transitory computer-readable medium of claim 27, when it is determined from the most recent uploader job record that status for the most recent uploader job record indicates running, further comprising:

assigning, via the events uploader manager, a worker thread for the particular events file that was read, wherein the worker thread comprises: a particular events file reader and a particular event loader; and upserting, at the events uploader job detail table of the data store via the events uploader manager, the most recent uploader job record for the application server with updated job detail information; and at the events file reader: reading the events file that includes the starting group identifier, serializing the events from the events file and sending the events to the event loader;

wherein the step of writing the plurality of events from each events file that was read to the data store, comprises: loading and saving, via the events loader, each of the events from each events file to a row of an event table maintained at the data store; and further comprising:

updating, in the events uploader job detail table via the events uploader manager, the status of the uploader job record that corresponds to the events file to indicate completed;

deleting the events file from the TEFSS via the events uploader manager; and searching, via the events uploader manager, the TFESS for another events file that includes the starting group identifier.

29. A computer-implemented method performed by an application server comprising an events file uploader service and an indirect events writer that is configured to instantiate a plurality of event capture threads each comprising an instance of an events file writer, the computer-implemented method comprising:

at an events file writer of an event capture thread:
  generating a particular events file that comprises a plurality of events received from an in-memory buffer service when those events are unable to be directly written to a data store, wherein the data store comprises: an events uploader job detail table that comprises a plurality of rows, wherein each row is configured to store an uploader job record;
  writing the particular events file to a temporary events file storage system (TEFSS) that is configured to temporarily store the particular events file for subsequent writing to the data store;

at an events uploader manager of the events file uploader service:
  creating an uploader job record for that particular events file that includes job detail information that points to that particular events file; and
  writing the uploader job record to the events uploader job detail table; and at the events file uploader service:
  reading the particular events file from the TEFSS; and
  writing the plurality of events from that particular events file that was read to the data store.

* * * * *